United States Patent
Breakfield et al.

(10) Patent No.: US 12,439,924 B2
(45) Date of Patent: *Oct. 14, 2025

(54) *METHYLOBACTERIUM* COMPOSITIONS FOR IMPROVING CORN YIELD

(71) Applicant: NewLeaf Symbiotics, Inc., St. Louis, MO (US)

(72) Inventors: Natalie Breakfield, St. Louis, MO (US); Charles Michael McFatrich, St. Louis, MO (US)

(73) Assignee: NewLeaf Symbiotics, Inc., St. Louis, MO (US)

( * ) Notice: Subject to any disclaimer, the term of this patent is extended or adjusted under 35 U.S.C. 154(b) by 1155 days.

This patent is subject to a terminal disclaimer.

(21) Appl. No.: 17/299,409

(22) PCT Filed: Dec. 2, 2019

(86) PCT No.: PCT/US2019/064034
§ 371 (c)(1),
(2) Date: Jun. 3, 2021

(87) PCT Pub. No.: WO2020/117690
PCT Pub. Date: Jun. 11, 2020

(65) Prior Publication Data
US 2022/0053768 A1 Feb. 24, 2022

Related U.S. Application Data

(60) Provisional application No. 62/878,164, filed on Jul. 24, 2019, provisional application No. 62/774,640, filed on Dec. 3, 2018.

(51) Int. Cl.
*A01N 63/20* (2020.01)
*A01N 25/04* (2006.01)
*A01N 25/12* (2006.01)
*C12Q 1/689* (2018.01)

(52) U.S. Cl.
CPC ............. *A01N 63/20* (2020.01); *A01N 25/04* (2013.01); *A01N 25/12* (2013.01); *C12Q 1/689* (2013.01)

(58) Field of Classification Search
CPC ........ A01N 63/20; A01N 25/04; A01N 25/12; C12Q 1/689
See application file for complete search history.

(56) References Cited

U.S. PATENT DOCUMENTS

| | | |
|---|---|---|
| 5,106,648 A | 4/1992 | Williams |
| 5,512,069 A | 4/1996 | Holland et al. |
| 8,181,388 B2 | 5/2012 | Berger |
| 9,181,541 B2 | 11/2015 | Bogosian |
| 9,845,426 B2 | 12/2017 | Agashe et al. |
| 10,111,438 B2 | 10/2018 | Floro et al. |
| 10,212,939 B2 | 2/2019 | Floro et al. |
| 10,287,544 B2 | 5/2019 | Bosnian |
| 2010/0249378 A1 | 9/2010 | Wanasundara et al. |
| 2012/0017338 A1 | 1/2012 | Wu et al. |
| 2013/0288318 A1 | 10/2013 | Wood et al. |
| 2013/0324407 A1* | 12/2013 | Bogosian ................. C12N 1/20 435/177 |
| 2016/0295868 A1 | 10/2016 | Jones et al. |
| 2016/0302423 A1 | 10/2016 | Jones et al. |
| 2016/0302425 A1 | 10/2016 | Didonato et al. |
| 2017/0086464 A1 | 3/2017 | Floro et al. |
| 2017/0135352 A1 | 5/2017 | Breakfield et al. |
| 2017/0164618 A1 | 6/2017 | Breakfield et al. |
| 2017/0238553 A1 | 8/2017 | Jones et al. |
| 2018/0295841 A1 | 10/2018 | Rioux |
| 2022/0053768 A1 | 2/2022 | Breakfield et al. |

FOREIGN PATENT DOCUMENTS

| | | |
|---|---|---|
| WO | 2013181610 A1 | 12/2013 |
| WO | 2014194189 A1 | 12/2014 |
| WO | 2015/085063 A1 | 6/2015 |
| WO | 2015/085116 A1 | 6/2015 |
| WO | 2015085115 A1 | 6/2015 |
| WO | 2018106899 A1 | 6/2018 |
| WO | 2020117689 A1 | 6/2020 |

OTHER PUBLICATIONS

Abanda-Nkpwatt, D., et al., "Molecular Interaction Between Methylobacterium Extorquens and Seedlings: Growth Promotion, Methanol Consumption, and Localization of the Methanol Emission Site," 2006, J Exper Botany, 57/15:4025-4032, 8 pages.
Altschul, S.F., et al., "Basic Local Alignment Search Tool," 1990, J Mol Biol, 215:403-410, 8 pages.
Bentley, D.R., et al., "Accurate Whole Human Genome Sequencing Using Reversible Terminator Chemistry," 2008, Nature, 456:53-59, 7 pages.
Broekaert, W.F., et al., "An Automated Quantitative Assay for Fungal Growth Inhibition," 1990, FEMS Microbiol Lett, 1990, 69:55-60, 5 pages.
Cao, Y-R., et al., "*Methylobacterium soli* sp. nov. a Methanol-Utilizing Bacterium Isolated from the Forest Soil," 2011, Antonie van Leeuwenhoek, 99:629-634, Abstract only.
Caporaso, G., et al., "Ultra-High-Throughput Microbial Community Analysis on the Illumina HiSeq and MiSeq Platforms," 2012, The ISME J, 6:1621-1624, 4 pages.
Comai, L., et al., "An Altered aroA Gene Product Confers Resistance to the Herbicide Glyphosate," 1983, Science, 221/4608:370-371, 2 pages.
Corpe, W.A., et al., "Ecology of the Methylotrophic Bacteria on Living Leaf Surfaces," 1989, FEMS Microbiol Ecol, 62:243-200, 7 pages.
Green, P.N., et al., "Review of the genus *Methylobacterium* and Closely Related Organisms: A Proposal that Some *Methylobacterium* Species be Reclassified into a New Genus, *Methylorubrum* gen. nov.," 2018, Intel J Syst Evol Microbiol, 68:2727-2748, 22 pages.
Holland, M.A., "Methylobacterium and Plants," 1997, Recent Res Devel in Plant Physio, 1:207-213, 7 pages.

(Continued)

*Primary Examiner* — Zohreh A Fay
(74) *Attorney, Agent, or Firm* — Stinson LLP

(57) ABSTRACT

The present invention provides yield enhancing compositions comprising *Methylobacterium*, methods for improving corn yield, and methods of making the compositions. Also provided are isolated yield enhancing *Methylobacterium*.

10 Claims, No Drawings

Specification includes a Sequence Listing.

(56) References Cited

OTHER PUBLICATIONS

Konstantinidis, K.T., et al., "Genomic Insights that Advance the Species Definition for Prokaryotes," 2005, PNAS, 102/7:2567-2572, 6 pages.
Koressaar, T., et al., "Enhancements and Modifications of Primer Design Program Primer3," 2007, Bioinform Applic Note, 23/10:1289-1291, 3 pages.
Kutschera,, U., "Plant-Associated Methylobacteria as Co-Evolved Phytosymbionts. A Hypothesis," 2007, Plant Signal Behav, 2:74-78, 5 pages.
Lidstrom, M.E., "Chapter 1.20 Aerobic Methylotrophic Prokaryotes," Prokaryotes, 2006, 2:618-634, 17 pages.
Madhaiyan, M., et al., Influence of Plant Species and Environmental Conditions on Epiphytic and Endophytic Pink-Pigmented Facultative Methylotrophic Bacterial Populations Associated with Field-Grown Rice Cultivars, 2007, J Microbiol Biotechnol, 17/10:1645-1654, 10 pages.
Madhaiyan, M., et al., "Pink-Pigmented Facultative Methylotrophic Bacteria Accelerate Germination, Growth and Yield of Sugarcane Clone Co86032 (*Saccharum officinarum* L.)," 2005, Biol Fertil Soils, 41:350-358, 9 pages.
Madhaiyan, M., et al., "Growth Promotion and Induction of Systemic Resistance in Rice Cultivar C0-47 (*Oryza sativa* L.) by *Methylobacterium* spp," 2004, Bot Bull Acad Sin, 45:315-324, 20 pages.
Minami, T., et al., "Metagenomic Analysis Revealed Methylamine and Ureide Utilization of Soybean-Associated Methylobacterium," 2016, Microbes Environ, 31/3:268-278, 11 pages.
Sanger, F., et al., "DNA Sequencing with Chain-Terminating Inhibitors," 1977, PNAS, 74/12:5463-5467, 5 pages.
Stanier, R.Y., et al., The Aerobic Pseudomonads: A Taxonomic Study, 1996, J Gen Microbiol, 43:159-234, 76 pages.
Stanier, R.Y., et al., The Aerobic Pseudomonads: A Taxonomic Study, 1996, J Gen Microbiol, 43:235-313, 36 pages.
Sy, A., et al., "Methylotrophic Methylobacterium Bacteria Nodulate and Fix Nitrogen in Symbiosis with Legumes", J Bacteriology, 2001, 183/1:214-220, 7 pages.
Sy, A., et al., "Methylotrophic Metabolism is Advantageous for Methylobacterium Extorquens During Colonization of Medicago Truncatula Under Competitive Conditions," 2005, Appl Environ Microbiol, 71/11:7245-7252, 8 pages.
Untergasser, A., et al., "Primer3—New Capabilities and Interfaces," Nucl Acids Res, 2012, 40/15:e115, 12 pages.
Vogel, H.J., et al., "Acetylornithinase of *Escherichia coli*: Partial Purification and Some Properties", J Biol Chem, 1956, 218:97-106, 11 pages.
Whittenbury et al., "Enrichment, Isolation and Some Properties of Methane-Utilizing Bacteria", J Gen Microbiol, 1970, 61:205-218.
International Preliminary Report on Patentability issued in International PCT Application No. PCT/US2019/064034 dated Jun. 8, 2021, 10 pages.
International Search Report and Written Opinion issued in International PCT Application No. PCT/US2019/64034 dated Apr. 14, 2020, 16 pages.
Lamont, Byron B. et al., Seeds as a Source of Carbon, Nitrogen, and Phosphorus for Seedling Establishment in Temperate Regions: A Synthesis, American Journal of Plant Sciences, Apr. 2013, pp. 30-40.
Jimenez-Gomez, Alejandro et al., Plant probiotic bacteria enhance the quality of fruit and horticultural crops, AIMS Microbiology, 2017, 3(3), pp. 483-501.
Biari, A. et al., Growth Promotion and Enhanced Nutrient Uptake of Maize (*Zea mays* L.) by Application of Plant Growth Promoting Rhizobacteria in Arid Region of Iran, Journal of Biological Sciences, 2008, 8(6), pp. 1015-1020.
Stefanescu, Raluca et al., Maldi-Tof Mass Spectrometric Analysis of Zeins Extracted from Maize Seeds, Acta Chemica IASI, 2017, 25(1), pp. 73-86.
De Aquino, Gisele Silva et al., Plant growth promoting rhizobacteria increased canola yield and root system, Journal of Plant Nutrition, 2022, 8 pages.
Madhaiyan, Munusamy et al., Regulation of ethylene levels in canola (*Brassica campestris*) by 1-aminocyclopropane-1-carboxylate deaminase-containing Methylobacterium fujisawaense, Planta, 2006, 224, pp. 268-278.

* cited by examiner

METHYLOBACTERIUM COMPOSITIONS FOR IMPROVING CORN YIELD

CROSS-REFERENCE TO RELATED APPLICATIONS

This patent application claims the benefit of U.S. 62/774,640, filed Dec. 3, 2018, and U.S. 62/878,164, filed Jul. 24, 2019, which are each incorporated herein by reference in their entireties.

SEQUENCE LISTING STATEMENT

A sequence listing containing the file named "53907_190085_ST25.txt" which is 21493 bytes (measured in MS-Windows®) and created on Nov. 26, 2019, contains 73 nucleotide sequences, is provided herewith via the USPTO's EFS system, and is incorporated herein by reference in its entirety.

BACKGROUND

One-carbon organic compounds such as methane and methanol are found extensively in nature, and are utilized as carbon sources by bacteria classified as methanotrophs and methylotrophs. Methanotrophic bacteria include species in the genera *Methylobacter, Methylomonas, Methylomicrobium, Methylococcus, Methylosinus, Methylocystis, Methylosphaera, Methylocaldum,* and *Methylocella* (Lidstrom, 2006). Methanotrophs possess the enzyme methane monooxygenase, that incorporates an atom of oxygen from $O_2$ into methane, forming methanol. All methanotrophs are obligate one-carbon utilizers that are unable to use compounds containing carbon-carbon bonds. Methylotrophs, on the other hand, can also utilize more complex organic compounds, such as organic acids, higher alcohols, sugars, and the like. Thus, methylotrophic bacteria are facultative methylotrophs. Methylotrophic bacteria include species in the genera *Methylobacterium, Hyphomicrobium, Methylophilus, Methylobacillus, Methylophaga, Aminobacter, Methylorhabdus, Methylopila, Methylosulfonomonas, Marinosulfonomonas, Paracoccus, Xanthobacter, Ancylobacter* (also known as *Microcyclus*), *Thiobacillus, Rhodopseudomonas, Rhodobacter, Acetobacter, Bacillus, Mycobacterium,* Arthobacter, and *Nocardia* (Lidstrom, 2006).

Most methylotrophic bacteria of the genus *Methylobacterium* are pink-pigmented. They are conventionally referred to as PPFM bacteria, being pink-pigmented facultative methylotrophs. Green (2005, 2006) identified twelve validated species in the genus *Methylobacterium*, specifically *M. aminovorans, M. chloromethanicum, M. dichloromethanicum, M. extorquens, M. fujisawaense, M. mesophilicum, M. organophilum, M. radiotolerans, M. rhodesianum, M. rhodinum, M. thiocyanatum,* and *M. zatmanii*. However, *M. nidulans* is a nitrogen-fixing *Methylobacterium* that is not a PPFM (Sy et al., 2001). *Methylobacterium* are found in soil, dust, fresh water, sediments, and leaf surfaces, as well as in industrial and clinical environments (Green, 2006).

SUMMARY

Methods for improving corn plant yield that comprise: (a) applying a composition a to a corn plant or a corn plant part, wherein the composition comprises (i) *Methylobacterium* isolate NLS0807 (NRRL B-67743), NLS0662 (NRRL B-67742), NLS0648 (NRRL B-67741), NLS0109 (NRRL B-67340), or variants thereof, or (ii) a combination of *Methylobacterium* isolate NLS0109 (NRRL B-67340) or a variant thereof, and *Methylobacterium* isolate NLS0017 (B-50931) or a variant thereof; wherein said composition further comprises at least one additional component selected from the group consisting of an additional active ingredient, an agriculturally acceptable adjuvant, and an agriculturally acceptable excipient; and, (b) growing the corn plant to maturity, thereby improving yield of the corn plant are provided herein. In certain embodiments of the methods, the composition is applied to a corn seed. In certain embodiments of the aforementioned methods, the composition comprises a solid substance with the *Methylobacterium* grown thereon and adhered thereto, or an emulsion having the *Methylobacterium* grown therein. In certain embodiments of any of the aforementioned methods, the composition comprises the *Methylobacterium* at a titer of about $1 \times 10^6$ CFU/gm to about $1 \times 10^{14}$ CFU/gm for a solid composition or at a titer of about $1 \times 10^6$ CFU/mL to about $1 \times 10^{11}$ CFU/mL for a liquid composition. In certain embodiments of the aforementioned methods, the composition comprises NLS0807 (NRRL B-67743), NLS0662 (NRRL B-67742), or a variant thereof. In certain embodiments of any of the aforementioned methods, the composition comprises NLS0109 or a variant thereof and NLS0017 or a variant thereof. In certain embodiments of any of the aforementioned methods, the *Methylobacterium* variant is glyphosate resistant or glufosinate resistant. In certain embodiments of the aforementioned methods, the applied composition coats or partially coats the corn plant or a part thereof. In certain embodiments of the aforementioned methods, the composition is applied to foliage of the corn plant. In certain embodiments of the aforementioned methods, the composition further comprises a fungicide. In certain embodiments of the aforementioned methods, the composition is applied at about the VE to about the V3 stage of development, about the V3 to about the V5 stage of development, about the V2 to V4, or V3 stage of development. In certain embodiments of the aforementioned methods, the methods further comprise the step of harvesting seed from the mature corn plant. In certain embodiments of the aforementioned methods, yield of harvested seed is increased in comparison to yield of harvested seed obtained from a control corn plant that did not receive an application of the *Methylobacterium*. In certain embodiments of the aforementioned methods, the composition is applied by spraying, coating, partially coating, immersing, and/or imbibing the corn plant or plant part with the composition. In certain embodiments of the aforementioned methods, the applied composition coats or partially coats the corn plant or a part thereof, wherein partial coating includes coating at least 5%, 10%, 20%, 30%, 40%, 50%, 60%, 70%, 80%, 90%, 95%, 98%, 99%, or about 99.5% of the surface area of the corn plant or a part thereof. In certain embodiments of the aforementioned methods, the corn plant part is a seed. In certain embodiments of the aforementioned methods, the composition comprises *Methylobacterium* isolate NLS0807 (NRRL B-67743), NLS0662 (NRRL B-67742), NLS0648 (NRRL B-67741), NLS0109 (NRRL B-67340), or a combination of *Methylobacterium* isolates NLS0109 (NRRL B-67340) and NLS0017 (B-50931). In certain embodiments of the aforementioned methods, the composition further comprises an additional active ingredient. In certain embodiments of the aforementioned methods, the additional active ingredient is selected from the group consisting of a fungicide, insecticide, nematicide, and biological. In certain embodiments of the aforementioned methods, the biological is a biocontrol agent other than NLS0109. In certain embodiments of the aforementioned methods, the additional active ingredient is selected from the group consisting of clothianidin, *Bacillus firmus*, abamectin, thiamethoxam, imidacloprid, azoxystrobin, fluopyram, fluoxastrobin, ipconazole, mefenoxam, metalaxyl, penflufen, prothioconazole, pyraclostrobin, and sedaxane. In certain embodiments of the aforementioned methods, the growing of the corn plant occurs in a field in the continental United States located east of the Mississippi river. In certain embodiments of the aforementioned methods, the growing of the corn plant occurs in a field in the continental United States located west of the Mississippi river. In certain embodiments of the aforementioned methods, the composition comprises (i) a *Methylobacterium* wherein the chromosomal genomic DNA has at least 99%, 99.9, 99.8, 99.7, 99.6%, or 99.5% sequence identity to chromosomal genomic DNA of NLS0807 (NRRL B-67743), NLS0662 (NRRL B-67742), NLS0648 (NRRL B-67741), or NLS0109 (NRRL B-67340), or (ii) a combination of *Methylobacterium* isolates wherein the chromosomal genomic DNA of said isolates has at least 99%, 99.9, 99.8, 99.7, 99.6%, or 99.5% sequence identity to chromosomal genomic DNA of NLS0109 (NRRL B-67340) or NLS0017 (B-50931). In certain embodiments, the composition comprises (i) a *Methylobacterium* having genomic DNA comprising one or more polynucleotide marker fragments of at least 50, 60, 100, 120, 180, 200, 240, or 300 nucleotides of SEQ ID NOS: 25-27, SEQ ID NOS: 37-39, SEQ ID NOS: 49-51 or SEQ ID NOS: 1-3; or (ii) a combination of *Methylobacterium* isolates wherein a first isolate has genomic DNA comprising one or more polynucleotide marker fragments of at least 50, 60, 100, 120, 180, 200, 240, or 300 nucleotides of SEQ ID NOS: 1-3 and a second isolate has genomic DNA comprising one or more polynucleotide marker fragments of at least 50, 60, 100, 120, 180, 200, 240, or 300 nucleotides of SEQ ID NOS: 13-15. In certain embodiments, the *Methylobacterium* has in its genome one or more marker fragments comprising a sequence having at least 98%, 99%, or 99.5% sequence identity across the entire length of SEQ ID NOS: 9-11. In certain embodiments of the aforementioned methods, the composition further comprises a second biological selected from the group consisting of ISO01 (NRRL B-50929), ISO02 (NRRL B-50930), ISO03 (NRRL B-50931), ISO04 (NRRL B-50932), ISO05 (NRRL B-50933), ISO06 (NRRL B-50934), ISO07 (NRRL B-50935), ISO08 (NRRL B-50936), ISO09 (NRRL B-50937), ISO10 (NRRL B-50938), ISO11 (NRRL B-50939), ISO12 (NRRL B-50940), ISO13 (NRRL B-50941), and ISO14 (NRRL B-50942).

Also provided are corn plants or corn plant parts that are coated or partially coated with a composition comprising a *Methylobacterium*, wherein the *Methylobacterium* is (i) NLS0807 (NRRL B-67743), NLS0662 (NRRL B-67742), NLS0648 (NRRL B-67741), or variants thereof, or (ii) a combination of *Methylobacterium* isolate NLS0109 (NRRL B-67340) or a variant thereof, and *Methylobacterium* isolate NLS0017 (B-50931) or a variant thereof. In certain embodiments, the composition further comprises at least one second component selected from the group consisting of an additional active ingredient, an agriculturally acceptable adjuvant, and an agriculturally acceptable excipient. In certain aforementioned embodiments, the composition comprises the *Methylobacterium* at a titer of about $1 \times 10^6$ CFU/gm to about $1 \times 10^{14}$ CFU/gm for a solid composition or at a titer of about $1 \times 10^6$ CFU/mL to about $1 \times 10^{11}$ CFU/mL for a liquid composition. In certain aforementioned embodiments, *Methylobacterium* is *Methylobacterium* isolate NLS0807 (NRRL B-67743) or a variant thereof. In certain aforementioned embodiments, the corn plant part is selected from the group consisting of a seed, a leaf, an ear, and a tassel. In certain aforementioned embodiments, the composition comprises *Methylobacterium* isolate NLS0807 (NRRL B-67743), NLS0662 (NRRL B-67742), NLS0648 (NRRL B-67741), or a combination of *Methylobacterium* isolates NLS0109 (NRRL B-67340) and NLS0017 (B-50931). In certain aforementioned embodiments, the composition comprises an additional active ingredient. In certain aforementioned embodiments, the additional active ingredient is selected from the group consisting of a fungicide, insecticide, nematicide, and biological. In certain aforementioned embodiments, the biological is a biocontrol agent other than NLS0109. In certain aforementioned embodiments, the additional active ingredient is selected from the group consisting of clothianidin, *Bacillus firmus*, abamectin, thiamethoxam, imidacloprid, azoxystrobin, fluopyram, fluoxastrobin, ipconazole, mefenoxam, metalaxyl, penflufen, prothioconazole, pyraclostrobin, and sedaxane. In certain aforementioned embodiments, the composition comprises (i) a *Methylobacterium* wherein the chromosomal genomic DNA has at least 99%, 99.9, 99.8, 99.7, 99.6%, or 99.5% sequence identity to chromosomal genomic DNA of NLS0807 (NRRL B-67743), NLS0662 (NRRL B-67742), NLS0648 (NRRL B-67741), or NLS0109 (NRRL B-67340), or (ii) a combination of *Methylobacterium* isolates wherein the chromosomal genomic DNA of said isolates has at least 99%, 99.9, 99.8, 99.7, 99.6%, or 99.5% sequence identity to chromosomal genomic DNA of NLS0109 (NRRL B-67340) or NLS0017 (B-50931). In certain aforementioned embodiments, the composition further comprises a second biological selected from the group consisting of ISO01 (NRRL B-50929), ISO02 (NRRL B-50930), ISO03 (NRRL B-50931), ISO04 (NRRL B-50932), ISO05 (NRRL B-50933), ISO06 (NRRL B-50934), ISO07 (NRRL B-50935), ISO08 (NRRL B-50936), ISO09 (NRRL B-50937), ISO10 (NRRL B-50938), ISO11 (NRRL B-50939), ISO12 (NRRL B-50940), ISO13 (NRRL B-50941), and ISO14 (NRRL B-50942).

DESCRIPTION

Definitions

The term "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

Where a term is provided in the singular, embodiments comprising the plural of that term are also provided.

As used herein, the terms "include," "includes," and "including" are to be construed as at least having the features or encompassing the items to which they refer while not excluding any additional unspecified features or unspecified items.

As used herein, the phrases "adhered thereto" and "adherent" refer to *Methylobacterium* that are associated with a solid substance by growing, or having been grown, on a solid substance.

As used herein, the phrase "active ingredient" refers to a biological or pesticide in a composition for treatment of plants and/or plant parts.

As used herein, the term "biological" refers to a component of a composition for treatment of plants or plant parts comprised of or derived from a microorganism. Biologicals include biocontrol agents, other beneficial microorganisms, microbial extracts, natural products, plant growth activators or plant defense agents. Non-limiting examples of biocontrol agents include bacteria, fungi, beneficial nematodes, and viruses.

As used herein, the phrase "agriculturally acceptable adjuvant" refers to a substance that enhances the performance of a biological or pesticide in a composition for treatment of plants and/or plant parts. In certain compositions, a biological can comprise a mono-culture or co-culture of *Methylobacterium*.

As used herein, the phrase "agriculturally acceptable excipient" refers to an essentially inert substance that can be used as a diluent and/or carrier for a biological or pesticide in a composition for treatment of plants and/or plant parts. In certain compositions, a biological can comprise a mono-culture or co-culture of *Methylobacterium*.

As used herein, the term "strain" shall include all isolates of such strain.

As used herein, the phrase "control plant" refers to a plant that had not received treatment with a yield enhancing *Methylobacterium* or composition comprising the same at either the seed or any subsequent stage of the control plant's development. In certain embodiments, a control plant can be a plant that was treated with an additional active ingredient or a yield neutral *Methylobacterium*.

As used herein, the phrase "co-culture of *Methylobacterium*" refers to a *Methylobacterium* culture comprising at least two strains of *Methylobacterium* or at least two species of *Methylobacterium*.

As used herein, the phrase "contaminating microorganism" refers to microorganisms in a culture, fermentation broth, fermentation broth product, or composition that were not identified prior to introduction into the culture, fermentation broth, fermentation broth product, or composition.

As used herein, "variant" when used in the context of a *Methylobacterium* isolate, refers to any isolate that has chromosomal genomic DNA with at least 99%, 99.9, 99.8, 99.7, 99.6%, or 99.5% sequence identity to chromosomal genomic DNA of a deposited *Methylobacterium* isolate provided herein. A variant of an isolate can be obtained from various sources including soil, plants or plant material, and water, particularly water associated with plants and/or agriculture. Variants include derivatives obtained from deposited isolates. *Methylobacterium* isolates or strains can be sequenced (for example as taught by Sanger et al. (1977), Bentley et al. (2008) or Caporaso et al. (2012)) and genome-scale comparison of the sequences conducted (Konstantinos et al. (2005)) using sequence analysis tools (for example, BLAST, as taught by Altschul et al. (1990)).

As used herein, "derivative" when used in the context of a *Methylobacterium* isolate, refers to any *Methylobacterium* that is obtained from a deposited *Methylobacterium* isolate provided herein. Derivatives of a *Methylobacterium* isolate include, but are not limited to, derivatives obtained by selection, derivatives selected by mutagenesis and selection, and genetically transformed *Methylobacterium* obtained from a *Methylobacterium* isolate. A "derivative" can be identified, for example based on genetic identity to the strain or isolate from which it was obtained and will generally exhibit chromosomal genomic DNA with at least 99%, 99.9, 99.8, 99.7, 99.6%, or 99.5% sequence identity to chromosomal genomic DNA of the strain or isolate from which it was derived.

As used herein, the term "emulsion" refers to a colloidal mixture of two immiscible liquids wherein one liquid is the continuous phase and the other liquid is the dispersed phase. In certain embodiments, the continuous phase is an aqueous liquid and the dispersed phase is liquid that is not miscible, or partially miscible, in the aqueous liquid.

As used herein, the phrase "essentially free of contaminating microorganisms" refers to a culture, fermentation broth, fermentation product, or composition where at least about 95% of the microorganisms present by amount or type in the culture, fermentation broth, fermentation product, or composition are the desired *Methylobacterium* or other desired microorganisms of pre-determined identity.

As used herein, the phrase "inanimate solid substance" refers to a substance which is insoluble or partially soluble in water or aqueous solutions and which is either non-living or which is not a part of a still-living organism from which it was derived.

As used herein, the phrase "mono-culture of *Methylobacterium*" refers to a *Methylobacterium* culture consisting of a single strain of *Methylobacterium*.

As used herein, a "pesticide" refers to an insecticide, fungicide, nematocide, bacteriocide, or any combination thereof.

As used herein, the phrase "bacteriostatic agent" refers to agents that inhibit growth of bacteria but do not kill the bacteria.

As used herein, the phrase "pesticide does not substantially inhibit growth of said *Methylobacterium*" refers to any pesticide that when provided in a composition comprising a fermentation product comprising a solid substance wherein a mono-culture or co-culture of *Methylobacterium* is adhered thereto, results in no more than a 50% inhibition of *Methylobacterium* growth when the composition is applied to a plant or plant part in comparison to a composition lacking the pesticide. In certain embodiments, the pesticide results in no more than a 40%, 20%, 10%, 5%, or 1% inhibition of *Methylobacterium* growth when the composition is applied to a plant or plant part in comparison to a composition lacking the pesticide.

As used herein, the term "*Methylobacterium*" refers to genera and species in the methylobacteriaceae family, including bacterial species in the *Methylobacterium* genus and proposed *Methylorubrum* genus (Green and Ardley (2018)). *Methylobacterium* includes pink-pigmented facultative methylotrophic bacteria (PPFM) and also encompasses the non-pink-pigmented *Methylobacterium nodulans*, as well as colorless mutants of *Methylobacterium* isolates. For example, and not by way of limitation, "*Methylobacterium*" refers to bacteria of the species listed below as well as any new *Methylobacterium* species that have not yet been reported or described that can be characterized as *Methylobacterium* or Methylorubrum based on phylogenetic analysis: *Methylobacterium adhaesivum; Methylobacterium oryzae; Methylobacterium aerolatum; Methylobacterium oxalidis; Methylobacterium aquaticum; Methylobacterium persicinum; Methylobacterium brachiatum; Methylobacterium phyllosphaerae; Methylobacterium brachythecii; Methylobacterium phyllostachyos; Methylobacterium bullatum; Methylobacterium platani; Methylobacterium cerastii; Methylobacterium pseudosasicola; Methylobacterium currus; Methylobacterium radiotolerans; Methylobacterium dankookense; Methylobacterium soli; Methylobacterium frigidaeris; Methylobacterium specialis; Methylobacterium*

*fujisawaense; Methylobacterium tardum; Methylobacterium gnaphalii; Methylobacterium tarhaniae; Methylobacterium goesingense; Methylobacterium thuringiense; Methylobacterium gossipiicola; Methylobacterium trifolii; Methylobacterium gregans; Methylobacterium variabile; Methylobacterium haplocladii; Methylobacterium aminovorans (Methylorubrum aminovorans); Methylobacterium hispanicum; Methylobacterium extorquens (Methylorubrum extorquens); Methylobacterium indicum; Methylobacterium podarium (Methylorubrum podarium); Methylobacterium iners; Methylobacterium populi (Methylorubrum populi); Methylobacterium isbiliense; Methylobacterium pseudosasae (Methylorubrum pseudosasae); Methylobacterium jeotgali; Methylobacterium rhodesianum (Methylorubrum rhodesianum); Methylobacterium komagatae; Methylobacterium rhodinum (Methylorubrum rhodinum); Methylobacterium longum; Methylobacterium salsuginis (Methylorubrum salsuginis); Methylobacterium marchantiae; Methylobacterium suomiense (Methylorubrum suomiense; Methylobacterium mesophilicum; Methylobacterium thiocyanatum (Methylorubrum thiocyanatum); Methylobacterium nodulans; Methylobacterium zatmanii (Methylorubrum zatmanii); Methylobacterium organophilum.*

As used herein, the phrase "solid substance" refers to a substance which is insoluble or partially soluble in water or aqueous solutions.

As used herein, the phrase "solid phase that can be suspended therein" refers to a solid substance that can be distributed throughout a liquid by agitation.

As used herein, the term "non-regenerable" refers to either a plant part or processed plant product that cannot be regenerated into a whole plant.

As used herein, the phrase "substantially all of the solid phase is suspended in the liquid phase" refers to media wherein at least 95%, 98%, or 99% of solid substance(s) comprising the solid phase are distributed throughout the liquid by agitation.

As used herein, the phrase "substantially all of the solid phase is not suspended in the liquid phase" refers to media where less than 5%, 2%, or 1% of the solid is in a particulate form that is distributed throughout the media by agitation.

To the extent to which any of the preceding definitions is inconsistent with definitions provided in any patent or non-patent reference incorporated herein by reference, any patent or non-patent reference cited herein, or in any patent or non-patent reference found elsewhere, it is understood that the preceding definition will be used herein.

Yield Enhancing *Methylobacterium*, Compositions Comprising Yield Enhancing *Methylobacterium*, Methods of their Use, and Methods of Making Various yield enhancing *Methylobacterium* isolates, compositions comprising these *Methylobacterium*, methods of using the compositions to improve corn plant yield, and methods of making the compositions are provided herein. In certain embodiments, yield enhancing *Methylobacterium* isolates include NLS0807 (NRRL B-67743), NLS0662 (NRRL B-67742), NLS0648 (NRRL B-67741), NLS0109 (NRRL B-67340) or variants thereof, or a combination of *Methylobacterium* isolate NLS0109 (NRRL B-67340) or a variant thereof and *Methylobacterium* isolate NLS0017 (B-50931) or a variant thereof. Amounts of the compositions that comprise yield enhancing *Methylobacterium* sufficient to provide for improved corn plant yield can be determined by measuring any or all of changes in yield relative to untreated plants or plant parts. In certain embodiments, yield can be assessed by measuring output of seed on a per unit area basis (i.e. bushels per acre, kilograms per hectare, and the like), where the yield enhancing *Methylobacterium* treated plants or plants grown from *Methylobacterium* treated seed are grown at about the same density as the control plants. In certain embodiments, yield can be assessed by measuring output on a per plant or per plant part basis (grams of seed per plant, grams of seed per cob, kernels per plant, kernels per cob and the like) of the yield enhancing *Methylobacterium* treated plants in comparison to untreated control plants.

Isolated yield enhancing *Methylobacterium* are provided herein. In certain embodiments, the *Methylobacterium* is selected from the group consisting of *M. radiotolerans, M. komagatae*, and *M. gregans*. In certain embodiments, the yield enhancing *Methylobacterium* isolate is selected from the group consisting of NLS0807 (NRRL B-67743), NLS0662 (NRRL B-67742), NLS0648 (NRRL B-67741), NLS0109 (NRRL B-67340), and variants thereof. In certain embodiments, the yield enhancing *Methylobacterium* is a combination of *Methylobacterium* isolates NLS0109 and NLS0017 (NRRL B-50931). In certain embodiments, the yield enhancing *Methylobacterium* isolate can enhance yield when applied to a corn seed, when applied in vegetative stages of corn development, or when applied during reproductive stages of corn development. In certain embodiments, the yield enhancing *Methylobacterium* has a chromosomal genomic DNA with at least 99%, 99.9, 99.8, 99.7, 99.6%, or 99.5% sequence identity to chromosomal genomic DNA of NLS0807 (NRRL B-67743), NLS0662 (NRRL B-67742), NLS0648 (NRRL B-67741), or NLS0109 (NRRL B-67340); or the yield enhancing *Methylobacterium* is a combination of *Methylobacterium* variants of NLS0109 and NLS0017 having chromosomal genomic DNA with at least 99%, 99.9, 99.8, 99.7, 99.6%, or 99.5% sequence identity to chromosomal genomic DNA of NLS0109 (NRRL B-67340) and NLS0017. In certain embodiments, the yield enhancing *Methylobacterium* provides for at least about 2%, at least about 3%, at least about 4%, at least about 5%, at least about 6%, at least about 7%, at least about 8%, at least about 9%, at least about 10%, or at least about 15% increases in yield of a treated plant or a plant arising from a treated seed in comparison to untreated control plants or plants grown from untreated seeds. In certain embodiments, the yield enhancing *Methylobacterium* provides for at least about 2%, at least about 3%, at least about 4%, at least about 5%, at least about 6%, at least about 7%, at least about 8%, at least about 9%, to at least about a 10% or at least about a 20% increase in yield of a treated plant or a plant grown from a treated seed in comparison to untreated control plants or plants arising from untreated seeds.

In certain embodiments, the yield enhancing *Methylobacterium* provides for increased yield when applied to a seed. In certain embodiments, the yield enhancing *Methylobacterium* provides for increases in yield when applied to seed in furrow at planting. In certain embodiments, the yield enhancing *Methylobacterium* provides for increases in yield when applied during corn vegetative stages of development. In certain embodiments, the yield enhancing *Methylobacterium* provides for increases in yield when applied just prior to or during corn reproductive stages of development. In certain embodiments of any of the aforementioned compositions, the composition comprises a solid substance wherein a mono-culture or co-culture of *Methylobacterium* is adhered thereto. In certain embodiments where the *Methylobacterium* is adhered to a solid substance, the composition comprises a colloid formed by the solid substance wherein a mono-culture or co-culture of *Methylobacterium* is adhered thereto and a liquid. In certain embodiments, the colloid is a gel. In certain embodiments of certain aforementioned compositions, composition is an emulsion that does not contain a solid substance. In certain embodiments of any of the aforementioned compositions, the yield enhancing *Methylobacterium* is selected from the group consisting of NLS0807 (NRRL B-67743), NLS0662 (NRRL B-67742), and variants thereof. In certain embodiments of any of the aforementioned compositions, the yield enhancing *Methylobacterium* is selected from the group consisting of NLS0648 (NRRL B-67741), NLS0109 (NRRL B-67340), and variants thereof. In certain embodiments of any of the aforementioned compositions, the yield enhancing *Methylobacterium* is a combination of *Methylobacterium* NLS0109 and NLS0017. In certain embodiments, the yield enhancing *Methylobacterium* has a chromosomal genomic DNA with at least 99%, 99.9, 99.8, 99.7, 99.6%, or 99.5% sequence identity to chromosomal genomic DNA of NLS0807 (NRRL B-67743), NLS0662 (NRRL B-67742), NLS0648 (NRRL B-67741), or NLS0109 (NRRL B-67340); or the yield enhancing *Methylobacterium* is a combination of *Methylobacterium* variants of NLS0109 and NLS0017 having chromosomal genomic DNA with at least 99%, 99.9, 99.8, 99.7, 99.6%, or 99.5% sequence identity to chromosomal genomic DNA of NLS0109 (NRRL B-67340) and NLS0017 (NRRL B-50931).

In certain embodiments, isolated yield enhancing *Methylobacterium* can be identified by treating a plant, a seed, soil in which the plant or a plant arising from the seed are grown, or other plant growth media in which the plant or a plant arising from the seed are grown and assaying for increased yield.

In certain embodiments, corn seed or corn plants in the vegetative stages of development are treated with the yield enhancing *Methylobacterium* The vegetative stages of corn are as follows: VE (coleoptile emergence to just prior to first leaf collaring), V1 (first leaf collared), V2 (first and second leaf collared), V3 (first through third leaf collared), V4 (first through fourth leaf collared), V5 (first through fifth leaf collared), V6 (first through sixth leaf collared), and so on up to V18 (plants with the 18th leaf collared). A description of the corn vegetative stages can be found on the world wide web (internet) at agronext.iastate.edu/corn/production/management/growth/CornGrowthandDevelopment.html and in "Corn Growth and Development", Abendroth et al. Iowa State University Extension and Outreach publication PMR 19 Mar. 2011). In certain embodiments, the yield enhancing *Methylobacterium* are applied at about the VE to about the V4, V5, or V6 stage of development. In certain embodiments, the yield enhancing *Methylobacterium* are applied at about the VE, V1, V2, or V3 to about the V4, V5, or V6 stage of development. In certain embodiments, the yield enhancing *Methylobacterium* that is applied to the seed or during a vegetative stage is NLS0807 (NRRL B-67743.

In certain embodiments, the yield enhancing *Methylobacterium* are applied at about the V5, V6 to about the Vn stage or VT stage of development to about the R2, R3, R4, R5, or R6 stage of development. In certain embodiments, the yield enhancing *Methylobacterium* are applied at about the V12, V16, V18, Vn, or VT stage of development to about the R2, R3, or R4 stage of development. In certain embodiments, the yield enhancing *Methylobacterium* are applied at about the R1 stage of development.

In certain embodiments, the yield enhancing *Methylobacterium* are applied to a transgenic corn plant that is herbicide, insect or disease tolerant. In certain embodiments, the yield enhancing *Methylobacterium* are applied before, during, or after the application of glyphosate to a transgenic corn plant that is glyphosate tolerant. Commercially available glyphosate formulations that can be used include, but are not limited to, Roundup Original MAX®, Roundup PowerMAX®, Roundup UltraMax®, or RoundUp WeatherMAX® (Monsanto Co., St. Louis, MO., USA); Touchdown IQ® or Touchdown Total® (Syngenta, Wilmington, Delaware, USA); Glyphomax®, Glyphomax Plus®, or Glyphomax XRT® (Dow Agrosciences LLC, Indianapolis, IN, USA). Corn plants at are typically sprayed with glyphosate at about the V3 and/or at about the V6 vegetative development stage. In certain embodiments, the yield enhancing *Methylobacterium* that is applied before, during, or after the application of glyphosate a *Methylobacterium* that is selected for glyphosate resistance. Selections for glyphosate resistant bacteria that have been described (Comai et al. (1983)) can be adapted for selection of yield enhancing *Methylobacterium*. The selection and use of glyphosate resistant yield enhancing *Methylobacterium* from mutagenized or other populations of *Methylobacterium* such as NLS0807 (NRRL B-67743), NLS0662 (NRRL B-67742), NLS0648 (NRRL B-67741), NLS0109 (NRRL B-67340), and variants thereof is provided herein. Various *Methylobacterium* isolates provided herein are disclosed in Table 1.

TABLE 1

*Methylobacterium* isolates

| Deposit Identifier | ISOLATE No. | NLS No. | USDA ARS NRRL No.[1] |
|---|---|---|---|
| *Methylobacterium* sp. #1 | ISO01 | NLS0046 | NRRL B-50929 |
| *Methylobacterium* sp. #2 | ISO02 | NLS0020 | NRRL B-50930 |
| *Methylobacterium* sp. #3 | ISO03 | NLS0017 | NRRL B-50931 |
| *Methylobacterium* sp. #4 | ISO04 | NLS0042 | NRRL B-50932 |
| *Methylobacterium* sp. #5 | ISO05 | NLS0089 | NRRL B-50933 |
| *Methylobacterium* sp. #6 | ISO06 | NLS0068 | NRRL B-50934 |
| *Methylobacterium* sp. #7 | ISO07 | NLS0065 | NRRL B-50935 |
| *Methylobacterium* sp. #8 | ISO08 | NLS0069 | NRRL B-50936 |
| *Methylobacterium* sp. #9 | ISO09 | NLS0062 | NRRL B-50937 |
| *Methylobacterium* sp. #10 | ISO10 | NLS0064 | NRRL B-50938 |
| *Methylobacterium* sp. #11 | ISO11 | NLS0021 | NRRL B-50939 |
| *Methylobacterium* sp. #12 | ISO12 | NLS0066 | NRRL B-50940 |
| *Methylobacterium* sp. #13 | ISO13 | NLS0037 | NRRL B-50941 |
| *Methylobacterium* sp. #14 | ISO14 | NLS0038 | NRRL B-50942 |
| *Methylobacterium* #15 | ISO15 | NLS0044 | NRRL B-67339 |
| *Methylobacterium* #16 | ISO16 | NLS0109 | NRRL B-67340 |
| *Methylobacterium* sp (#18) | ISO18 | NLS0648 | NRRL B-67741 |
| *Methylobacterium* sp (#19) | ISO19 | NLS0662 | NRRL B-67742 |
| *Methylobacterium* sp (#20) | ISO20 | NLS0807 | NRRL B-67743 |

[1]Deposit number for strain deposited with the AGRICULTURAL RESEARCH SERVICE CULTURE COLLECTION (NRRL) of the National Center for Agricultural Utilization Research, Agricultural Research Service, U.S. Department of Agriculture, 1815 North University Street, Peoria, Illinois 61604 U.S.A. under the terms of the Budapest Treaty on the International Recognition of the Deposit of Microorganisms for the Purposes of Patent Procedure. Subject to 37 CFR §1.808(b), all restrictions imposed by the depositor on the availability to the public of the deposited material will be irrevocably removed upon the granting of any patent from this patent application.

Variants of a *Methylobacterium* isolate listed in Table 1 include isolates obtained therefrom by genetic transformation, mutagenesis and/or insertion of a heterologous sequence. In some embodiments, such variants are identified by the presence of chromosomal genomic DNA with at least 99%, 99.9, 99.8, 99.7, 99.6%, or 99.5% sequence identity to chromosomal genomic DNA of the strain from which it was derived. In certain embodiments, such variants are distinguished by the presence of one or more unique DNA sequences that include: (i) a unique sequence of SEQ ID NOs: 1 to 3, SEQ ID NOs: 13 to 15, SEQ ID NOs: 25-27, SEQ ID NOS: 37-39, SEQ ID NOs: 49 to 51, and SEQ ID NOs: 61-73; or (ii) sequences with at least 98% or 99% sequence identity across the full length of SEQ ID NOs: 1 to 3, SEQ ID NOs: 13 to 15, SEQ ID NOs: 25-27, SEQ ID NOs: 37-39, SEQ ID NOs: 49 to 51, and SEQ ID NOs: 61-73.

Co-assigned patent applications that disclose additional specific uses of certain *Methylobacterium* strains of Table 1 such as: increasing soybean yield (U.S. Patent Appl. Pub. No. 20160302423); improving lettuce cultivation (U.S. Pat. No. 10,212,939); improving tomato growth (U.S. Patent Appl. Pub. No. 20170086464); improving corn yield (U.S. Patent Appl. Pub. No. 20160295868); improving soy yield (US2016/0302423); improving fruit production (U.S. Pat. No. 10,111,438); controlling corn rootworm (US20170238553); controlling root lesion nematodes (US20170164618); controlling root knot nematodes (US20170135352); and controlling fungal disease (US20180295841 and WO2018106899) and are each incorporated herein by reference.

Also provided herein are methods for improving corn yield that comprise applying any of the aforementioned compositions provided herein to a plant or a plant part in an amount that provides for increased corn yield in the plant, plant part, or a plant obtained therefrom relative to yield of a control plant, plant part, or plant obtained therefrom that had not received an application of the composition. In certain embodiments, the plant part is selected from the group consisting of a leaf, a stem, a flower, a root, a cob, and a seed. In certain embodiments, the method further comprises the step of harvesting at least one plant part selected from the group consisting of a leaf, a stem, a flower, a root, a cob, or a seed from the plant or plant part. In certain embodiments of any of the aforementioned methods, the methods further comprise obtaining a processed food or feed composition from the plant or plant part. In certain embodiments, the processed food or feed composition is a meal or a paste. In certain embodiments of any of the aforementioned methods, the yield enhancing *Methylobacterium* is selected from the group consisting of NLS0807 (NRRL B-67743), NLS0662 (NRRL B-67742), NLS0648 (NRRL B-67741), or NLS0109 (NRRL B-67340), and variants thereof. In certain embodiments of any of the aforementioned compositions, the yield enhancing *Methylobacterium* is a combination of *Methylobacterium* NLS0109 and NLS0017, or variants thereof.

Also provided are methods of making the compositions useful for improving corn yield that comprise combining a yield enhancing *Methylobacterium* with an agriculturally acceptable excipient and/or with an agriculturally acceptable adjuvant. In certain embodiments of the methods, the *Methylobacterium* is adhered to a solid substance. In certain embodiments of the methods, the *Methylobacterium* is adhered to the solid substance is combined with a liquid to form a composition that is a colloid. In certain embodiments of the methods, the colloid is a gel. In certain embodiments of the methods, the *Methylobacterium* adhered to the solid substance is provided by culturing the *Methylobacterium* in the presence of the solid substance. In certain embodiments of the methods, the composition comprises an emulsion. In certain embodiments of the methods, the *Methylobacterium* is provided by culturing the *Methylobacterium* in an emulsion. In certain embodiments of any of the aforementioned methods, the yield enhancing *Methylobacterium* is selected from the group consisting of NLS0807 (NRRL B-67743), NLS0662 (NRRL B-67742), and variants thereof. In certain embodiments of any of the aforementioned methods, the yield enhancing *Methylobacterium* is selected from the group consisting of NLS0648 (NRRL B-67741), NLS0109 (NRRL B-67340), and variants thereof. In certain embodiments of any of the aforementioned compositions, the yield enhancing *Methylobacterium* is a combination of *Methylobacterium* NLS0109 and NLS0017, or variants thereof.

Methods where *Methylobacterium* are cultured in biphasic media comprising a liquid phase and a solid substance have been found to significantly increase the resultant yield of *Methylobacterium* relative to methods where the *Methylobacterium* are cultured in liquid media alone. In certain embodiments, the methods can comprise growing the *Methylobacterium* in liquid media with a particulate solid substance that can be suspended in the liquid by agitation under conditions that provide for *Methylobacterium* growth. In certain embodiments where particulate solid substances are used, at least substantially all of the solid phase can thus be suspended in the liquid phase upon agitation. Such particulate solid substances can comprise materials that are about 1 millimeter or less in length or diameter. In certain embodiments, the degree of agitation is sufficient to provide for uniform distribution of the particulate solid substance in the liquid phase and/or optimal levels of culture aeration. However, in other embodiments provided herein, at least substantially all of the solid phase is not suspended in the liquid phase, or portions of the solid phase are suspended in the liquid phase and portions of the solid phase are not suspended in the liquid phase. Non-particulate solid substances can be used in certain biphasic media where the solid phase is not suspended in the liquid phase. Such non-particulate solid substances include, but are not limited to, materials that are greater than about 1 millimeter in length or diameter. Such particulate and non-particulate solid substances also include, but are not limited to, materials that are porous, fibrous, or otherwise configured to provide for increased surface areas for adherent growth of the *Methylobacterium*. Biphasic media where portions of the solid phase are suspended in the liquid phase and portions of the solid phase are not suspended in the liquid phase can comprise a mixture of particulate and non-particulate solid substances. Such particulate and non-particulate solid substances used in any of the aforementioned biphasic media also include, but are not limited to, materials that are porous, fibrous, or otherwise configured to provide for increased surface areas for adherent growth of the *Methylobacterium*. In certain embodiments, the media comprises a colloid formed by a solid and a liquid phase. A colloid comprising a solid and a liquid can be pre-formed and added to liquid media or can be formed in media containing a solid and a liquid. Colloids comprising a solid and a liquid can be formed by subjecting certain solid substances to a chemical and/or thermal change. In certain embodiments, the colloid is a gel. In certain embodiments, the liquid phase of the media is an emulsion. In certain embodiments, the emulsion comprises an aqueous liquid and a liquid that is not miscible, or only partially miscible, in the aqueous liquid. Liquids that are not miscible, or only partially miscible, in water include, but are not limited to, any of the following: (1) liquids having a miscibility in water that is equal to or less than that of pentanol, hexanol, or heptanol at 25 degrees C.; (2) liquids comprising an alcohol, an aldehyde, a ketone, a fatty acid, a phospholipid, or any combination thereof; (3) alcohols selected from the group consisting of aliphatic alcohols containing at least 5 carbons and sterols; (4) an animal oil, microbial oil, synthetic oil, plant oil, or combination thereof; and/or, (5) a plant oil is selected from the group consisting of corn, soybean, cotton, peanut, sunflower, olive, flax, coconut, palm, rapeseed, sesame seed, safflower, and combinations thereof. In certain embodiments, the immiscible or partially immiscible liquid can comprise at least about 0.02% to about 20% of the liquid phase by mass. In certain embodiments, the methods can comprise obtaining a biphasic culture media comprising the liquid, the solid, and *Methylobacterium* and incubating the culture under conditions that provide for growth of the *Methylobacterium*. Biphasic culture medias comprising the liquid, the solid, and *Methylobacterium* can be obtained by a variety of methods that include, but are not limited to, any of: (a) inoculating a biphasic media comprising the liquid and the solid substance with *Methylobacterium*; (b) inoculating the solid substance with *Methylobacterium* and then introducing the solid substance comprising the *Methylobacterium* into the liquid media; (c) inoculating the solid substance with *Methylobacterium*, incubating the *Methylobacterium* on the solid substance, and then introducing the solid substance comprising the *Methylobacterium* into the liquid media; or (d) any combination of (a), (b), or (c). Methods and compositions for growing *Methylobacterium* in biphasic media comprising a liquid and a solid are disclosed in co-assigned U.S. Pat. Nos. 9,181,541 and 9,845,462, which are incorporated herein by reference in their entirety, and in co-assigned International Patent Publication WO2013181610, published Dec. 5, 2013, which is incorporated herein by reference in its entirety.

Methods where *Methylobacterium* are cultured in media comprising an emulsion have also been found to significantly increase the resultant yield of *Methylobacterium* relative to methods where the *Methylobacterium* are cultured in liquid media alone. In certain embodiments, the methods for making the compositions provided herein can comprise growing the yield enhancing *Methylobacterium* in an emulsion under conditions that provide for *Methylobacterium* growth. Medias comprising the emulsion and yield enhancing *Methylobacterium* can be obtained by a variety of methods that include, but are not limited to, any of: (a) inoculating a media comprising the emulsion with *Methylobacterium*; (b) inoculating the aqueous liquid with the *Methylobacterium*, introducing the non-aqueous liquid, and mixing to form an emulsion; (c) inoculating the aqueous liquid with the *Methylobacterium*, introducing the non-aqueous liquid, and mixing to form an emulsion; or (d) any combination of (a), (b), or (c). In certain embodiments, the emulsion comprises an aqueous liquid and a liquid that is not miscible, or only partially miscible, in the aqueous liquid. Non-aqueous liquids that are not miscible, or only partially miscible, in water include, but are not limited to, any of the following: (1) liquids having a miscibility in water that is equal to or less than that of n-pentanol, n-hexanol, or n-heptanol at 25 degrees C.; (2) liquids comprising an alcohol, an aldehyde, a ketone, a fatty acid, a phospholipid, or any combination thereof; (3) alcohols is selected from the group consisting of aliphatic alcohols containing at least 5, 6, or 7 carbons and sterols; (4) an animal oil, microbial oil, synthetic oil, plant oil, or combination thereof; and/or, (5) a plant oil is selected from the group consisting of corn, soybean, cotton, peanut, sunflower, olive, flax, coconut, palm, rapeseed, sesame seed, safflower, and combinations thereof. In certain embodiments, the immiscible or partially immiscible non-aqueous liquid can comprise at least about 0.02% to about 20% of the emulsion by mass. In certain embodiments, the immiscible or partially immiscible non-aqueous liquid can comprise at least about any of about 0.05%, 0.1%, 0.5%, or 1% to about 3%, 5%, 10%, or 20% of the emulsion by mass. Methods and compositions for growing *Methylobacterium* in media comprising an emulsion are disclosed in co-assigned U.S. Pat. No. 10,287,544 and International Patent Publication WO2014194189, published Dec. 4, 2014, which is incorporated herein by reference in its entirety.

In some embodiments, the composition or method disclosed herein may comprise one or more additional components. In some embodiments a second component can be an additional active ingredient, for example, a pesticide or a second biological. The pesticide may be, for example, an insecticide, a fungicide, an herbicide, or a nematicide. The second biological can be a biocontrol agent.

Non-limiting examples of insecticides and nematicides include carbamates, diamides, macrocyclic lactones, neonicotinoids, organophosphates, phenylpyrazoles, pyrethrins, spinosyns, synthetic pyrethroids, tetronic and tetramic acids. In particular embodiments insecticides and nematicides include abamectin, aldicarb, aldoxycarb, bifenthrin, carbofuran, chlorantraniliporle, chlothianidin, cyfluthrin, cyhalothrin, cypermethrin, deltamethrin, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, tioxazafen, spinetoram, spinosad, spirodichlofen, spirotetramat, tefluthrin, thiacloprid, thiamethoxam, and thiodicarb.

Non-limiting examples of useful fungicides include aromatic hydrocarbons, benzimidazoles, benzthiadiazole, carboxamides, carboxylic acid amides, morpholines, phenylamides, phosphonates, quinone outside inhibitors (e.g. strobilurins), thiazolidines, thiophanates, thiophene carboxamides, and triazoles. Particular examples of fungicides include acibenzolar-S-methyl, azoxystrobin, benalaxyl, bixafen, boscalid, carbendazim, cyproconazole, dimethomorph, epoxiconazole, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thifluzamide, thiophanate, tolclofos-methyl, trifloxystrobin, and triticonazole.

Non-limiting examples of herbicides include ACCase inhibitors, acetanilides, AHAS inhibitors, carotenoid biosynthesis inhibitors, EPSPS inhibitors, glutamine synthetase inhibitors, PPO inhibitors, PS II inhibitors, and synthetic auxins, Particular examples of herbicides include acetochlor, clethodim, dicamba, flumioxazin, fomesafen, glyphosate, glufosinate, mesotrione, quizalofop, saflufenacil, sulcotrione, and 2,4-D.

In some embodiments, compositions or methods disclosed herein may comprise an additional active ingredient which may be a second biological. The second biological could be a biocontrol agent, other beneficial microorganisms, microbial extracts, natural products, plant growth activators or a plant defense agent. Non-limiting examples of biocontrol agents include bacteria, fungi, beneficial nematodes, and viruses.

In certain embodiments, the second biological can be *Methylobacterium*. In certain embodiments, the second biological is a *Methylobacterium* listed in Table 1. In certain embodiments, the second biological is selected from the group consisting of ISO01 (NRRL B-50929), ISO02 (NRRL B-50930), ISO03 (NRRL B-50931), ISO04 (NRRL B-50932), ISO05 (NRRL B-50933), ISO06 (NRRL B-50934), ISO07 (NRRL B-50935), ISO08 (NRRL B-50936), ISO09 (NRRL B-50937), ISO10 (NRRL B-50938), ISO11 (NRRL B-50939), ISO12 (NRRL B-50940), ISO13 (NRRL B-50941), and ISO14 (NRRL B-50942). In certain embodiments, the second biological can be a *Methylobacterium* having chromosomal genomic DNA with at least 99%, 99.9, 99.8, 99.7, 99.6%, or 99.5% sequence identity to chromosomal genomic DNA of ISO01 (NRRL B-50929), ISO02 (NRRL B-50930), ISO03 (NRRL B-50931), ISO04 (NRRL B-50932), ISO05 (NRRL B-50933), ISO06 (NRRL B-50934), ISO07 (NRRL B-50935), ISO08 (NRRL B-50936), ISO09 (NRRL B-50937), ISO10 (NRRL B-50938), ISO11 (NRRL B-50939), ISO12 (NRRL B-50940), ISO13 (NRRL B-50941), or ISO14 (NRRL B-50942). In certain embodiments, the second biological can be a *Methylobacterium* selected from *M. gregans, M. radiotolerans, M. extorquens, M. populi, M. salsuginis, M. brachiatum*, and *M. komagatae*.

In certain embodiments, the second biological can be a bacterium of the genus Actinomycetes, *Agrobacterium, Arthrobacter, Alcaligenes*, Aureobacterium, Azobacter, *Beijerinckia, Brevibacillus, Burkholderia, Chromobacterium, Clostridium, Clavibacter, Comomonas, Corynebacterium, Curtobacterium, Enterobacter, Flavobacterium, Gluconobacter, Hydrogenophage, Klebsiella, Methylobacterium, Paenibacillus, Pasteuria, Phingobacterium, Photorhabdus, Phyllobacterium, Pseudomonas, Rhizobium, Bradyrhizobium, Serratia, Stenotrophomonas, Variovorax*, and *Xenorhadbus*. In particular embodiments the bacteria is selected from the group consisting of *Bacillus amyloliquefaciens, Bacillus cereus, Bacillus firmus, Bacillus, lichenformis, Bacillus pumilus, Bacillus sphaericus, Bacillus subtilis, Bacillus thuringiensis, Chromobacterium suttsuga, Pasteuria penetrans, Pasteuria usage*, and *Pseudomona fluorescens*.

In certain embodiments the second biological can be a fungus of the genus *Alternaria, Ampelomyces, Aspergillus, Aureobasidium, Beauveria, Colletotrichum, Coniothyrium, Gliocladium, Metarhisium, Muscodor, Paecilonyces, Trichoderma, Typhula, Ulocladium*, and *Verticilium*. In particular embodiments the fungus is *Beauveria bassiana, Coniothyrium minitans, Gliocladium* vixens, Muscodor albus, *Paecilomyces lilacinus*, or *Trichoderma polysporum*.

In further embodiments the second biological can be a plant growth activator or plant defense agent including, but not limited to harpin, *Reynoutria sachalinensis*, jasmonate, lipochitooligosaccharides, and isoflavones.

In further embodiments, the second biological can include, but is not limited to, various *Bacillus* sp., *Pseudomonas* sp., *Coniothyrium* sp., *Pantoea* sp., *Streptomyces* sp., and *Trichoderma* sp. Microbial biopesticides can be a bacterium, fungus, virus, or protozoan. Particularly useful biopesticidal microorganisms include various *Bacillus subtilis, Bacillus thuringiensis, Bacillus pumilis, Pseudomonas syringae, Trichoderma harzianum, Trichoderma virens*, and *Streptomyces lydicus* strains. Other microorganisms that are added can be genetically engineered or wild-type isolates that are available as pure cultures. In certain embodiments, it is anticipated that the biological or biocontrol agent can be provided in the fermentation broth, fermentation broth product, or composition in the form of a spore.

In certain embodiments, the fermentation broth, fermentation broth product, or compositions that comprise yield enhancing *Methylobacterium* can further comprise one or more introduced additional active ingredient or microorganism of pre-determined identity other than *Methylobacterium*.

In certain embodiments, the liquid culture medium is prepared from inexpensive and readily available components, including, but not limited to, inorganic salts such as potassium phosphate, magnesium sulfate and the like, carbon sources such as glycerol, methanol, glutamic acid, aspartic acid, succinic acid and the like, and amino acid blends such as peptone, tryptone, and the like. Exemplary liquid media that can be used include, but are not limited to, ammonium mineral salts (AMS) medium (Whittenbury et al., 1970), Vogel-Bonner (VB) minimal culture medium (Vogel and Bonner, 1956), and LB broth ("Luria-Bertani Broth").

In general, a solid substance that can be used in the methods and compositions to provide for the efficient growth of *Methylobacterium* can be any suitable solid substance which is insoluble or only partially soluble in water or aqueous solutions. Such suitable solid substances are also non-bacteriocidal or non-bacteriostatic with respect to yield enhancing *Methylobacterium* when the solid substances are provided in the liquid culture media. In certain embodiments, such suitable solid substances are also solid substances that are readily obtained in sterile form or rendered sterile. Solid substances can be sterilized by any method that provides for removal of contaminating microorganisms and thus include, but are not limited to, methods such as autoclaving, irradiation, chemical treatment, and any combination thereof. These solid substances include natural substances of animal, plant, microbial, fungal, or mineral origin, manmade substances, or combinations of natural and manmade substances. In certain embodiments, the solid substances are inanimate solid substances. Inanimate solid substances of animal, plant, microbial, or fungal origin can be obtained from animals, plants, microbes, or fungi that are inviable (i.e. no longer living) or that have been rendered inviable. Diatom shells are thus inanimate solid substances when previously associated diatom algae have been removed or otherwise rendered inviable. Since diatom shells are inanimate solid substances, they are not considered to be photosynthetic organisms or photosynthetic microorganisms. In certain embodiments, solid substances include, but are not limited to, sand, silt, soil, clay, ash, charcoal, diatomaceous earth and other similar minerals, ground glass or glass beads, ground ceramic materials, ceramic beads, bentonite, kaolin, talc, perlite, mica, vermiculite, silicas, quartz powder, montmorillonite, and combinations thereof. In certain embodiments, a solid substance can be a polymer or polymeric beads. Polymers that can be used as a solid substance include, but are not limited to, various polysaccharides such as cellulosic polymers and chitinous polymers which are insoluble or only partially soluble in water or aqueous solutions, agar (i.e. galactans), and combinations thereof. In certain embodiments, a solid substance can be an insoluble or only partially soluble salt crystal. Salt crystals that can be used include, but are not limited to, insoluble or only partially soluble carbonates, chromates, sulfites, phosphates, hydroxides, oxides, and sulfides. In certain embodiments, a solid substance can be a microbial cell, fungal cell, microbial spore, or fungal spore. In certain embodiments, a solid substance can be a microbial cell or microbial spore wherein the microbial cell or microbial spore is not a photosynthetic microorganism. In certain embodiments, the microbial cell or microbial spore is not a photosynthetic microorganism, where the photosynthetic microorganism is selected from the group consisting of algae, cyanobacteria, diatoms, *Botryococcus braunii, Chlorella, Dunaliella tertiolecta, Gracilaria, Pleurochrysis carterae, Sargassum*, and *Ulva*. In still other embodiments, a solid substance can be an inactivated (i.e. inviable) microbial cell, fungal cell, microbial spore, or fungal spore. In still other embodiments, a solid substance can be a quiescent (i.e. viable but not actively dividing) microbial cell, fungal cell, microbial spore, or fungal spore. In still other embodiments, a solid substance can be cellular debris of microbial origin. In still other embodiments, a solid substance can be particulate matter from any part of a plant. Plant parts that can be used to obtain the solid substance include, but are not limited to, cobs, husks, hulls, leaves, roots, flowers, stems, barks, seeds, and combinations thereof. Products obtained from processed plant parts including, but not limited to, bagasse, wheat bran, soy grits, crushed seed cake, stover, and the like can also be used. Such plant parts, processed plants, and/or processed plant parts can be milled to obtain the solid material in a particulate form that can be used. In certain embodiments, wood or a wood product including, but not limited to, wood pulp, sawdust, shavings, and the like can be used. In certain embodiments, the solid substance can be a particulate matter from an animal(s), including, but not limited to, bone meal, gelatin, ground or powdered shells, hair, macerated hide, and the like.

In certain embodiments, a solid substance is provided in a particulate form that provides for distribution of the solid substance in the culture media. In certain embodiments, a solid substance is comprised of particle of about 2 microns to about 1000 microns in average length or average diameter. In certain embodiments, a solid substance is comprised of particle of about 1 micron to about 1000 microns in average length or average diameter. In certain embodiments, a solid substance is a particle of about 1, 2, 4, 10, 20, or 40 microns to any of about 100, 200, 500, 750, or 1000 microns in average length or average diameter. Desirable characteristics of particles used in the methods and compositions provided herein include suitable wettability such that the particles can be suspended throughout the media upon agitation.

In certain embodiments, a solid substance is provided in the media as a colloid wherein the continuous phase is a liquid and the dispersed phase is the solid. Suitable solids that can be used to form colloids in liquid media used to grow yield enhancing *Methylobacterium* include, but are not limited to, various solids that are referred to as hydrocolloids. Such hydrocolloids used in the media, methods and compositions provided herein can be hydrophilic polymers, of plant, animal, microbial, or synthetic origin. Hydrocolloid polymers used in the methods can contain many hydroxyl groups and/or can be polyelectrolytes. Hydrocolloid polymers used in the compositions and methods provided herein include, but are not limited to, agar, alginate, arabinoxylan, carrageenan, carboxymethylcellulose, cellulose, curdlan, gelatin, gellan, β-glucan, guar gum, gum arabic, locust bean gum, pectin, starch, xanthan gum, and mixtures thereof. In certain embodiments, a colloid used in the media, methods, and compositions provided herein can comprise a hydrocolloid polymer and one or more proteins.

In certain embodiments, a solid substance can provide for adherent growth of the yield enhancing *Methylobacterium* on the solid substance. Yield enhancing *Methylobacterium* that are adhered to a solid substance are *Methylobacterium* that cannot be substantially removed by simply washing the solid substance with the adherent yield enhancing *Methylobacterium* with growth media whereas non-adherent *Methylobacterium* can be substantially removed by washing the solid substance with liquid growth media. In this context, "substantially removed" means that at least about 30%, 40%, 50%, 60%, 70%, or 80% the *Methylobacterium* present are removed when the solid substance is washed with three volumes of liquid growth media. Such washing can be effected by a variety of methods including, but not limited to, decanting liquid from a washed solid phase or passing liquid through a solid phase on a filter that permits flow through of bacteria in the liquid. In certain embodiments, the adherent yield enhancing *Methylobacterium* that are associated with the solid can include both *Methylobacterium* that are directly attached to a solid and/or *Methylobacterium* that are indirectly attached to a solid substance. *Methylobacterium* that are indirectly attached to a solid substance include, but are not limited to, *Methylobacterium* that are attached to another *Methylobacterium* or to another microorganism that is attached to a solid substance, *Methylobacterium* that are attached to a solid substance by being attached to another substance that is attached to a solid substance, and the like. In certain embodiments, at least 10%, 20%, 30%, 40%, 50%, 60%, 70%, 80%, 90%, 95%, 98%, 99%, 99.5% or 99.9% of the *Methylobacterium* in the fermentation broth, fermentation broth product, or compositions are *Methylobacterium* that are adhered to a solid substance. In certain embodiments, adherent yield enhancing *Methylobacterium* can be present on the surface of a solid substance in the fermentation broth, fermentation broth product, or composition at a density of at least about 1 *Methylobacterium*/20 square micrometers, of at least about 1 *Methylobacterium*/10 square micrometers, of at least about 1 *Methylobacterium*/10 square micrometers, of at least about 1 *Methylobacterium*/5 square micrometers, of at least about 1 *Methylobacterium*/2 square micrometers, or of at least about 1 *Methylobacterium*/square micrometer. In certain embodiments, adherent yield enhancing *Methylobacterium* can be present on the surface of a solid substance in the fermentation broth, fermentation broth product, or composition at a density of at least about 1 *Methylobacterium*/20 square micrometers to about 1 *Methylobacterium*/square micrometer, of at least about 1 *Methylobacterium*/10 square micrometers to about 1 *Methylobacterium*/square micrometer, of at least about 1 *Methylobacterium*/10 square micrometers to about 1 *Methylobacterium*/square micrometer, of at least about 1 *Methylobacterium*/5 square micrometers to about 1 *Methylobacterium*/square micrometer, or of at least about 1 *Methylobacterium*/2 square micrometers to about 1 *Methylobacterium*/square micrometer. In certain embodiments, adherent yield enhancing *Methylobacterium* can be present on the surface of a solid substance in the fermentation broth, fermentation broth product, or composition at a density of at least about 1 *Methylobacterium*/20 square micrometers to about 1 *Methylobacterium*/2 square micrometers, of at least about 1 *Methylobacterium*/10 square micrometers to about 1 *Methylobacterium*/2 square micrometers, of at least about 1 *Methylobacterium*/10 square micrometers to about 1 *Methylobacterium*/2 square micrometers, or of at least about 1 *Methylobacterium*/5 square micrometers to about 1 *Methylobacterium*/2 square micrometers. Biphasic fermentation broths provided herein can comprise a liquid phase that contains non-adherent *Methylobacterium*. In certain embodiments, titers of non-adherent *Methylobacterium* in the liquid phase can be less than about 100,000, 10,000, or 1,000 CFU/ml. In certain embodiments of any of the aforementioned compositions, the yield enhancing *Methylobacterium* is selected from the group consisting of NLS0807 (NRRL B-67743), NLS0662 (NRRL B-67742), and variants thereof. In certain embodiments of any of the aforementioned compositions, the yield enhancing *Methylobacterium* is selected from the group consisting of NLS0648 (NRRL B-67741), NLS0109 (NRRL B-67340), and variants thereof. In certain embodiments of any of the aforementioned compositions, the yield enhancing *Methylobacterium* is a combination of *Methylobacterium* NLS0109 and NLS0017, or variants thereof.

Fermentation broths with yield enhancing *Methylobacterium* at a titer of greater than about 5×108 colony-forming units per milliliter, at a titer of greater than about $1 \times 10^9$ colony-forming units per milliliter, at a titer of greater than about $1 \times 10^{10}$ colony-forming units per milliliter, at a titer of at least about $3 \times 10^{10}$ colony-forming units per milliliter are provided herein. In certain embodiments, fermentation broths provided herein can comprise yield enhancing *Methylobacterium* at a titer of at least about $5 \times 10^8$ colony-forming units per milliliter to at least about $3 \times 10^{10}$ colony-forming units per milliliter, at least about $5 \times 10^8$ colony-forming units per milliliter to at least about $4 \times 10^{10}$ colony-forming units per milliliter, or at least about $5 \times 10^8$ colony-forming units per milliliter to at least about $6 \times 10^{10}$ colony-forming units per milliliter. In certain embodiments, fermentation broths provided herein can comprise yield enhancing *Methylobacterium* at a titer of at least about $1 \times 10^9$ colony-forming units per milliliter to at least about $3 \times 10^{10}$ colony-forming units per milliliter, at least about $1 \times 10^9$ colony-forming units per milliliter to at least about $4 \times 10^{10}$ colony-forming units per milliliter, or at least about $1 \times 10^9$ colony-forming units per milliliter to at least about $6 \times 10^{10}$ colony-forming units per milliliter. In certain embodiments, fermentation broths provided herein will comprise yield enhancing *Methylobacterium* at a titer of at least about $1 \times 10^{10}$ colony-forming units per milliliter to at least about $3 \times 10^{10}$ colony-forming units per milliliter, at least about $1 \times 10^{10}$ colony-forming units per milliliter to at least about $4 \times 10^{10}$ colony-forming units per milliliter, or at least about $1 \times 10^{10}$ colony-forming units per milliliter to at least about $6 \times 10^{10}$ colony-forming units per milliliter. In certain embodiments, fermentation broths provided herein will comprise yield enhancing *Methylobacterium* at a titer of, at least about $3 \times 10^{10}$ colony-forming units per milliliter to at least about $4 \times 10^{10}$ colony-forming units per milliliter, or at least about $3 \times 10^{10}$ colony-forming units per milliliter to at least about $6 \times 10^{10}$ colony-forming units per milliliter. In certain embodiments of any of the aforementioned compositions, the yield enhancing *Methylobacterium* is selected from the group consisting of NLS0807 (NRRL B-67743), NLS0662 (NRRL B-67742), and variants thereof. In certain embodiments of any of the aforementioned compositions, the yield enhancing *Methylobacterium* is selected from the group consisting of NLS0648 (NRRL B-67741), NLS0109 (NRRL B-67340), and variants thereof. In certain embodiments of any of the aforementioned compositions, the yield enhancing *Methylobacterium* is a combination of *Methylobacterium* NLS0109 and NLS0017, or variants thereof.

Yield enhancing *Methylobacterium* can be obtained as fermentation products and used to make various compositions useful for treating plants or plant parts to improve corn yield. The *Methylobacterium* compositions can be applied to plants or plant parts in various forms, including for example as liquid compositions or as dried compositions, for example dried powders. Plants or plant parts that have been at least partially coated or coated with the fermentation broth products or compositions comprising yield enhancing *Methylobacterium* are thus provided. In certain embodiments, the plant part is a seed. Partial coating of a plant, or a plant part, such as a seed includes, but is not limited to coating at least about 5%, 10%, 20%, 30%, 40%, 50%, 60%, 70%, 80%, 90%, 95%, 98%, 99%, or about 99.5% of the surface area of the plant, plant part, or plant seed. Also provided are processed plant products that contain the fermentation broth products or compositions with yield enhancing *Methylobacterium* or adherent yield enhancing *Methylobacterium*. In some embodiments solid substances with adherent yield enhancing *Methylobacterium* can be used to make various compositions that are particularly useful for treating plant seeds. Seeds that have been at least partially coated with the fermentation broth products or compositions are thus provided. Partial coating of a seed includes, but is not limited to coating at least about 5%, 10%, 20%, 30%, 40%, 50%, 60%, 70%, 80%, 90%, 95%, 98%, 99%, or about 99.5% of the surface area of the seed. Also provided are processed seed products, including, but not limited to, meal, flour, feed, and flakes that contain the fermentation broth products or compositions provided herein. In certain embodiments, the processed plant product will be non-regenerable (i.e. will be incapable of developing into a plant). In certain embodiments, the solid substance used in the fermentation product or composition that at least partially coats the plant or plant part or that is contained in the processed plant or plant part product comprises a solid substance and associated or adherent yield enhancing *Methylobacterium* that can be readily identified by comparing a treated and an untreated plant or plant part or processed product thereof. In certain embodiments, the yield enhancing *Methylobacterium* is selected from the group consisting of NLS0807 (NRRL B-67743), NLS0662 (NRRL B-67742), and variants thereof. In certain embodiments, the yield enhancing *Methylobacterium* is selected from the group consisting of NLS0648 (NRRL B-67741), NLS0109 (NRRL B-67340), and variants thereof. In certain embodiments of any of the aforementioned compositions, the yield enhancing *Methylobacterium* is a combination of *Methylobacterium* NLS0109 and NLS0017, or variants thereof.

Compositions useful for treating plants or plant parts that comprise yield enhancing *Methylobacterium* can also further comprise additional components, including an active ingredient, an agriculturally acceptable adjuvant or an agriculturally acceptable excipient. An agriculturally acceptable adjuvant or an agriculturally acceptable excipient is typically an ingredient that does not cause undue phytotoxicity or other adverse effects when exposed to a plant or plant part. In certain embodiments, a solid substance used in a fermentation broth can itself be an agriculturally acceptable adjuvant or an agriculturally acceptable excipient so long as it is not bacteriocidal or bacteriostatic to the *Methylobacterium*. In some embodiments agriculturally acceptable adjuvants and/or excipients are added to *Methylobacterium* to increase stability and/or shelf life. In other embodiments, the composition further comprises at least one of an agriculturally acceptable adjuvant or an agriculturally acceptable excipient. Any of the aforementioned compositions can also further comprise an additional active ingredient. In certain embodiments, the additional active ingredient is a pesticide used in the composition that does not substantially inhibit growth of the *Methylobacterium*. As *Methylobacterium* are gram negative bacteria, suitable bacteriocides used in the compositions can include, but are not limited to, bacteriocides that exhibit activity against gram positive bacteria but not gram negative bacteria. Compositions provided herein can also comprise a bacteriostatic agent that does not substantially inhibit growth of the *Methylobacterium*. Bacteriostatic agents suitable for use in compositions provided herein include, but are not limited to, those that exhibit activity against gram positive bacteria but not gram negative bacteria. Any of the aforementioned compositions can also be an essentially dry product (i.e. having about 5% or less water content), a mixture of the composition with an emulsion, or a suspension.

Agriculturally acceptable adjuvants used in the compositions that comprise yield enhancing *Methylobacterium* include, but are not limited to, components that enhance product efficacy and/or products that enhance ease of product application. Adjuvants that enhance product efficacy can include various wetters/spreaders that promote adhesion to and spreading of the composition on plant parts, stickers that promote adhesion to the plant part, penetrants that can promote contact of the active agent with interior tissues, extenders that increase the half-life of the active agent by inhibiting environmental degradation, and humectants that increase the density or drying time of sprayed compositions. Wetters/spreaders used in the compositions can include, but are not limited to, non-ionic surfactants, anionic surfactants, cationic surfactants, amphoteric surfactants, organo-silicate surfactants, and/or acidified surfactants. Stickers used in the compositions can include, but are not limited to, latex-based substances, terpene/pinolene, and pyrrolidone-based substances. Penetrants can include mineral oil, vegetable oil, esterified vegetable oil, organo-silicate surfactants, and acidified surfactants. Extenders used in the compositions can include, but are not limited to, ammonium sulphate, or menthene-based substances. Humectants used in the compositions can include, but are not limited to, glycerol, propylene glycol, and diethyl glycol. Adjuvants that improve ease of product application include, but are not limited to, acidifying/buffering agents, anti-foaming/defoaming agents, compatibility agents, drift-reducing agents, dyes, and water conditioners. Anti-foaming/de-foaming agents used in the compositions can include, but are not limited to, dimethopolysiloxane. Compatibility agents used in the compositions can include, but are not limited to, ammonium sulphate. Drift-reducing agents used in the compositions can include, but are not limited to, polyacrylamides, and polysaccharides. Water conditioners used in the compositions can include, but are not limited to, ammonium sulphate.

Methods of treating plants and/or plant parts with the fermentation broths, fermentation broth products, and compositions comprising yield enhancing *Methylobacterium* are also provided herein. Treated plants, and treated plant parts obtained therefrom, include, but are not limited to, corn. Corn plant parts that are treated include, but are not limited to, leaves, stalks, primary roots, nodal roots, seeds, fruit, tassels, silks, husks, sheaths, shanks, coleoptiles, and the like. Seeds or other propagules of any of the aforementioned corn plants can be treated with the fermentation broths, fermentation broth products, fermentation products, and/or compositions provided herein.

In certain embodiments, plants and/or plant parts are treated by applying the fermentation broths, fermentation broth products, fermentation products, and compositions that comprise yield enhancing *Methylobacterium* as a spray. Such spray applications include, but are not limited to, treatments of a single plant part or any combination of plant parts. Spraying can be achieved with any device that will distribute the fermentation broths, fermentation broth products, fermentation products, and compositions to the plant and/or plant part(s). Useful spray devices include a boom sprayer, a hand or backpack sprayer, crop dusters (i.e. aerial spraying), and the like. Spraying devices and or methods providing for application of the fermentation broths, fermentation broth products, fermentation products, and compositions to either one or both of the adaxial surface and/or abaxial surface can also be used. Plants and/or plant parts that are at least partially coated with any of a biphasic fermentation broth, a fermentation broth product, fermentation product, or compositions that comprise a solid substance with yield enhancing *Methylobacterium* adhered thereto are also provided herein. In certain embodiments, the plant part is a seed. Partial coating of a plant or a plant part includes, but is not limited to coating at least about 5%, 10%, 20%, 30%, 40%, 50%, 60%, 70%, 80%, 90%, 95%, 98%, 99%, or about 99.5% of the surface area of the plant or plant part. In some embodiments, the plant part is a seed and partial coating includes, but is not limited to coating at least about 5%, 10%, 20%, 30%, 40%, 50%, 60%, 70%, 80%, 90%, 95%, 98%, 99%, or about 99.5% of the surface area of the seed. Also provided herein are processed plant products that comprise a solid substance with yield enhancing *Methylobacterium* adhered thereto.

In certain embodiments, seeds are treated by exposing the seeds to the fermentation broths, fermentation broth products, fermentation products, and compositions that comprise yield enhancing *Methylobacterium* Seeds can be treated with the fermentation broths, fermentation broth products, and compositions provided herein by methods including, but not limited to, imbibition, coating, spraying, and the like. Seed treatments can be effected with both continuous and/or a batch seed treaters. In certain embodiments, the coated seeds can be prepared by slurrying seeds with a coating composition containing a fermentation broth or fermentation broth product comprising yield enhancing *Methylobacterium* and air drying the resulting product. Air drying can be accomplished at any temperature that is not deleterious to the seed or the *Methylobacterium*, but the temperature will typically not be greater than 30 degrees Centigrade. The proportion of coating that comprises a solid substance and yield enhancing *Methylobacterium* includes, but is not limited to, a range of 0.1 to 25% by weight of the seed, 0.5 to 5% by weight of the seed, and 0.5 to 2.5% by weight of seed. In certain embodiments, a solid substance used in the seed coating or treatment will have yield enhancing *Methylobacterium* adhered thereon. In certain embodiments, a solid substance used in the seed coating or treatment will be associated with yield enhancing *Methylobacterium* and will be present in a fermentation broth, fermentation broth product, or composition obtained by the methods provided herein. Various seed treatment compositions and methods for seed treatment disclosed in U.S. Pat. Nos. 5,106,648, 5,512,069, and 8,181,388 are incorporated herein by reference in their entireties and can be adapted for use with an active agent comprising the fermentation broths, fermentation broth products, or compositions provided herein. In certain embodiments, the composition used to treat the seed can contain agriculturally acceptable excipients that include, but are not limited to, woodflours, clays, activated carbon, diatomaceous earth, fine-grain inorganic solids, calcium carbonate and the like. Clays and inorganic solids that can be used with the fermentation broths, fermentation broth products, or compositions provided herein include, but are not limited to, calcium bentonite, kaolin, china clay, talc, perlite, mica, vermiculite, silicas, quartz powder, montmorillonite and mixtures thereof. Agriculturally acceptable adjuvants that promote sticking to the seed that can be used include, but are not limited to, polyvinyl acetates, polyvinyl acetate copolymers, hydrolyzed polyvinyl acetates, polyvinylpyrrolidone-vinyl acetate copolymer, polyvinyl alcohols, polyvinyl alcohol copolymers, polyvinyl methyl ether, polyvinyl methyl ether-maleic anhydride copolymer, waxes, latex polymers, celluloses including ethylcelluloses and methylcelluloses, hydroxy methylcelluloses, hydroxypropylcellulose, hydroxymethylpropylcelluloses, polyvinyl pyrrolidones, alginates, dextrins, malto-dextrins, polysaccharides, fats, oils, proteins, karaya gum, jaguar gum, tragacanth gum, polysaccharide gums, mucilage, gum arabics, shellacs, vinylidene chloride polymers and copolymers, soybean-based protein polymers and copolymers, lignosulfonates, acrylic copolymers, starches, polyvinylacrylates, zeins, gelatin, carboxymethylcellulose, chitosan, polyethylene oxide, acrylamide polymers and copolymers, polyhydroxyethyl acrylate, methylacrylamide monomers, alginate, ethylcellulose, polychloroprene and syrups or mixtures thereof. Other useful agriculturally acceptable adjuvants that can promote coating include, but are not limited to, polymers and copolymers of vinyl acetate, polyvinylpyrrolidone-vinyl acetate copolymer and water-soluble waxes. Various surfactants, dispersants, anticaking-agents, foam-control agents, and dyes disclosed herein and in U.S. Pat. No. 8,181,388 can be adapted for use with an active agent comprising the fermentation broths, fermentation broth products, or compositions provided herein.

Provided herein are compositions that comprise yield enhancing *Methylobacterium* that provide for increase yield of corn plants relative to untreated plants, plant parts, and plants obtained therefrom that have not been exposed to the compositions. In certain embodiments, plant parts, including, but not limited to, a seed, a leaf, a flower, a stem, a root, or a coleoptile can be treated with the compositions provided herein to increase corn plant yield. Treatments or applications can include, but are not limited to, spraying, coating, partially coating, immersing, and/or imbibing the plant or plant parts with the compositions provided herein. Partial coating of a corn plant or a corn plant part includes, but is not limited to coating at least about 5%, 10%, 20%, 30%, 40%, 50%, 60%, 70%, 80%, 90%, 95%, 98%, 99%, or about 99.5% of the surface area of the corn plant or corn plant part. In some embodiments, the corn plant part that is partially coated is a corn plant seed. In certain embodiments, a seed, a leaf, a flower, a stem, a root, a cob, or a coleoptile can be immersed and/or imbibed with a liquid, semi-liquid, emulsion, or slurry of a composition provided herein. Such seed immersion or imbibition can be sufficient to provide for increased yield in a treated corn plant or corn plant grown from a treated seed in comparison to an untreated corn plant or corn plant grown from an untreated seed. In certain embodiments, plant seeds can be immersed and/or imbibed for at least 1, 2, 3, 4, 5, or 6 hours. Such immersion and/or imbibition can, in certain embodiments, be conducted at temperatures that are not deleterious to the plant seed or the *Methylobacterium*. In certain embodiments, the seeds can be treated at about 15 to about 30 degrees Centigrade or at about 20 to about 25 degrees Centigrade. In certain embodiments, seed imbibition and/or immersion can be performed with gentle agitation. In certain embodiments, the seed and/or coleoptile is exposed to the composition by providing the composition in furrow. Providing the composition in furrow represents one of several methods provided herein for applying a composition to a corn seed or to a corn plant at or prior to the VE stage of corn plant development.

Compositions provided herein comprising yield enhancing *Methylobacterium* and related methods are therefore expected to be useful in improving yield in a wide variety of corn plants, including, but not limited to, various *Zea mays* hybrids, inbreds, haploids, subspecies, and varieties. In certain embodiments, yield can be improved in dent corn (*Zea mays* var. *indentata*), flint corn (*Zea mays* var. *indurata*), flour corn (*Zea mays* var. *amylacea*), popcorn (*Zea mays* var. *everta*), pod corn (*Zea mays* var. *tunicata* Larrañaga ex A. St. Hil.) striped maize (*Zea mays* var. *japonica*), sweet corn (*Zea mays* var. *saccharata* and *Zea mays* var. *rugosa*), and/or waxy corn (*Zea mays* var. *ceratina*).

In certain embodiments, an amount of a composition provided herein that is sufficient to provide for increased corn yield can be a composition with yield enhancing *Methylobacterium* at a titer of at least about $1 \times 10^6$ colony-forming units per milliliter, at least about $5 \times 10^6$ colony-forming units per milliliter, at least about $1 \times 10^7$ colony-forming units per milliliter, at least about $5 \times 10^8$ colony-forming units per milliliter, at least about $1 \times 10^9$ colony-forming units per milliliter, at least about $1 \times 10^{10}$ colony-forming units per milliliter, or at least about $3 \times 10^{10}$ colony-forming units per milliliter. In certain embodiments, an amount of a composition provided herein that is sufficient to provide for increased corn yield to a plant or plant part can be a composition with yield enhancing *Methylobacterium* at a titer of about least about $1 \times 10^6$ colony-forming units per milliliter, at least about $5 \times 10^6$ colony-forming units per milliliter, at least about $1 \times 10^7$ colony-forming units per milliliter, or at least about $5 \times 10^8$ colony-forming units per milliliter to at least about $6 \times 10^{10}$ colony-forming units per milliliter of a liquid or an emulsion. In certain embodiments, an amount of a composition provided herein that is sufficient to provide for increased corn yield can be a fermentation broth product with a yield enhancing *Methylobacterium* titer of a solid phase of that product is at least about $1 \times 10^6$ colony-forming units per milliliter, at least about $5 \times 10^6$ colony-forming units per milliliter, at least about $1 \times 10^7$ colony-forming units per milliliter, or at least about $5 \times 10^8$ colony-forming units per gram to at least about $6 \times 10^{10}$ colony-forming units of *Methylobacterium* per gram of the solid phase. In certain embodiments, an amount of a composition provided herein that is sufficient to provide for increased corn yield can be a composition with a *Methylobacterium* titer of at least about $1 \times 10^6$ colony-forming units per gram, at least about $5 \times 10^6$ colony-forming units per gram, at least about $1 \times 10^7$ colony-forming units per gram, or at least about $5 \times 10^8$ colony-forming units per gram to at least about $6 \times 10^{10}$ colony-forming units of *Methylobacterium* per gram of particles in the composition containing the particles that comprise a solid substance wherein a mono-culture or co-culture of yield enhancing *Methylobacterium* is adhered thereto. In certain embodiments, an amount of a composition provided herein that is sufficient to provide for increased corn yield to a plant or plant part can be a composition with a *Methylobacterium* titer of at least about $1 \times 10^6$ colony-forming units per mL, at least about $5 \times 10^6$ colony-forming units per mL, at least about $1 \times 10^7$ colony-forming units per mL, or at least about $5 \times 10^8$ colony-forming units per mL to at least about $6 \times 10^{10}$ colony-forming units of *Methylobacterium* per mL in a composition comprising an emulsion wherein a mono-culture or co-culture of a yield enhancing *Methylobacterium* adhered to a solid substance is provided therein or grown therein. In certain embodiments, an amount of a composition provided herein that is sufficient to provide for increased corn yield to a plant or plant part can be a composition with a *Methylobacterium* titer of at least about $1 \times 10^6$ colony-forming units per mL, at least about $5 \times 10^6$ colony-forming units per mL, at least about $1 \times 10^7$ colony-forming units per mL, or at least about $5 \times 10^8$ colony-forming units per mL to at least about $6 \times 10^{10}$ colony-forming units of *Methylobacterium* per mL of in a composition comprising an emulsion wherein a mono-culture or co-culture of a yield enhancing *Methylobacterium* is provided therein or grown therein. In certain embodiments of any of the aforementioned compositions, the *Methylobacterium* is selected from the group consisting of (i) *Methylobacterium* isolate NLS0807 (NRRL B-67743), NLS0662 (NRRL B-67742), NLS0648 (NRRL B-67741), NLS0109 (NRRL B-67340), or variants thereof, or (ii) a combination of *Methylobacterium* isolate NLS0109 (NRRL B-67340) or a variant thereof, and *Methylobacterium* isolate NLS0017 (B-50931) or a variant thereof.

In certain embodiments, an amount of a composition provided herein that is sufficient to provide for increased corn yield can be a composition with a *Methylobacterium* at a titer of at least about $1 \times 10^4$ colony-forming units per milliliter, at least about $1 \times 10^5$ colony-forming units per milliliter, at least about $1 \times 10^6$ colony-forming units per milliliter, at least about $5 \times 10^6$ colony-forming units per milliliter, at least about $1 \times 10^7$ colony-forming units per milliliter, at least about $5 \times 10^8$ colony-forming units per milliliter, at least about $1 \times 10^9$ colony-forming units per milliliter, at least about $1 \times 10^{10}$ colony-forming units per milliliter, or at least about $3 \times 10^{10}$ colony-forming units per milliliter. In certain embodiments, an amount of a composition provided herein that is sufficient to provide for increased corn yield can be a composition with *Methylobacterium* at a titer of at least about $1 \times 10^4$ colony-forming units per milliliter, at least about $1 \times 10^5$ colony-forming units per milliliter, about least about $1 \times 10^6$ colony-forming units per milliliter, at least about $5 \times 10^6$ colony-forming units per milliliter, at least about $1 \times 10^7$ colony-forming units per milliliter, or at least about $5 \times 10^8$ colony-forming units per milliliter to at least about $6 \times 10^{10}$ colony-forming units per milliliter of a liquid or an emulsion. In certain embodiments, an amount of a composition provided herein that is sufficient to provide for increased corn yield can be a fermentation broth product with a *Methylobacterium* titer of a solid phase of that product is at least about $1 \times 10^4$ colony-forming units per gram, at least about $1 \times 10^5$ colony-forming units per gram, at least about $1 \times 10^6$ colony-forming units per gram, at least about $5 \times 10^6$ colony-forming units per gram, at least about $1 \times 10^7$ colony-forming units per gram, or at least about $5 \times 10^8$ colony-forming units per gram to at least about $6 \times 10^{10}$ colony-forming units of *Methylobacterium* per gram, at least about $1 \times 10^{11}$ colony-forming units of *Methylobacterium* per gram, at least about $1 \times 10^{12}$ colony-forming units of *Methylobacterium* per gram, at least about $1 \times 10^{13}$ colony-forming units of *Methylobacterium* per gram, or at least about $5 \times 10^{13}$ colony-forming units of *Methylobacterium* per gram of the solid phase. In certain embodiments, an amount of a composition provided herein that is sufficient to provide for increased corn yield can be a composition with a *Methylobacterium* titer of at least about $1 \times 10^6$ colony-forming units per gram, at least about $5 \times 10^6$ colony-forming units per gram, at least about $1 \times 10^7$ colony-forming units per gram, or at least about $5 \times 10^8$ colony-forming units per gram to at least about $6 \times 10^{10}$ colony-forming units of *Methylobacterium* per gram, at least about $1 \times 10^{11}$ colony-forming units of *Methylobacterium* per gram, at least about $1 \times 10^{12}$ colony-forming units of *Methylobacterium* per gram, at least about $1 \times 10^{13}$ colony-forming units of *Methylobacterium* per gram, or at least about $5 \times 10^{13}$ colony-forming units of *Methylobacterium* per gram of particles in the composition containing the particles that comprise a solid substance wherein a mono-culture or co-culture of *Methylobacterium* is adhered thereto. In certain embodiments, an amount of a composition provided herein that is sufficient to provide for increased corn yield can be a composition with a *Methylobacterium* titer of at least about $1 \times 10^6$ colony-forming units per mL, at least about $5 \times 10^6$ colony-forming units per mL, at least about $1 \times 10^7$ colony-forming units per mL, or at least about $5 \times 10^8$ colony-forming units per mL to at least about $6 \times 10^{10}$ colony-forming units of *Methylobacterium* per mL in a composition comprising an emulsion wherein a mono-culture or co-culture of a *Methylobacterium* adhered to a solid substance is provided therein or grown therein. In certain embodiments, an amount of a composition provided herein that is sufficient to provide for increased corn yield can be a composition with a *Methylobacterium* titer of at least about $1 \times 10^6$ colony-forming units per mL, at least about $5 \times 10^6$ colony-forming units per mL, at least about $1 \times 10^7$ colony-forming units per mL, or at least about $5 \times 10^8$ colony-forming units per mL to at least about $6 \times 10^{10}$ colony-forming units of *Methylobacterium* per mL of in a composition comprising an emulsion wherein a mono-culture or co-culture of a *Methylobacterium* is provided therein or grown therein. In certain embodiments of any of the aforementioned compositions, the *Methylobacterium* is *Methylobacterium* isolate NLS0807 (NRRL B-67743), NLS0662 (NRRL B-67742), NLS0648 (NRRL B-67741), NLS0109 (NRRL B-67340), or variants thereof, or (ii) a combination of *Methylobacterium* isolate NLS0109 (NRRL B-67340) or a variant thereof, and *Methylobacterium* isolate NLS0017 (B-50931) or a variant thereof. Also provided are corn plants and corn plant parts (e.g. seeds) that are coated or partially coated with any of the aforementioned compositions. Also provided are methods for improving corn yield by using any of the aforementioned compositions.

EXAMPLES

The following examples are included to demonstrate illustrative, non-limiting embodiments of the disclosure. It will be appreciated by those of skill in the art that the techniques disclosed in the following examples represent techniques discovered by the Applicants to function well in the practice of the invention. However, those of skill in the art should, in light of the instant disclosure, appreciate that many changes can be made in the specific embodiments that are disclosed, while still obtaining like or similar results, without departing from the scope of the disclosure.

Example 1. Increases in Corn Yield by Application of *Methylobacterium* Compositions in 2018 Field Trials In 2018, corn field trials were established at twelve locations for the purpose of evaluating 4 PPFM (pink-pigmented-facultative-methylotrophs of the species *Methylobacterium*) isolates and a combination of two different *Methylobacterium* isolates applied in-furrow at planting to corn plants. The trial at Frankfort, IN was not included in the corn foliar trial analysis due a portion of the trial experiencing damage.

Experimental Design

The trial was established using a Randomized Complete Block Design (RCBD) with 4 reps per location.

Methods

In preparation for the field trials, the PPFM cultures were grown in AMS+glycerol+peptone+diatomaceous earth, at 30° C. for 6 days. The AMS medium contains, per liter, 700 milligrams of dibasic potassium phosphate anhydrous, 540 milligrams of monobasic potassium phosphate anhydrous, one gram of magnesium sulfate heptahydrate, 500 milligrams of ammonium chloride anhydrous, and 200 milligrams of calcium chloride dihydrate.

AMS base medium was prepared from three stock solutions, listed below:

Stock Solution I: For One Liter at 50× Concentration
    dibasic potassium phosphate, anhydrous 35 grams
    monobasic potassium phosphate, anhydrous 27 grams Stock Solution II: For One Liter at 50× Concentration
  magnesium sulfate heptahydrate 50 grams
  ammonium chloride, anhydrous 25 grams
Stock Solution III: For One Liter at 50× Concentration
  calcium chloride dihydrate 10 grams
  Stock solutions I, II, and III were autoclaved separately.
  To prepare one liter of liquid AMS medium with glycerol, peptone, and diatomaceous earth, the following were added to 920 ml of distilled water:
  20 ml of stock solution I
  20 ml of stock solution II
  20 ml of stock solution III
  20 ml of a 50% glycerol stock solution
  10 grams of peptone
  2 grams of diatomaceous earth The resulting solution with suspended diatomaceous earth was sterilized by autoclaving. The cultures were harvested by centrifugation at 5000 rpm for 15 minutes and then re-suspended in AMS+glycerol+peptone with 20% glycerol as a cryoprotectant at 10× concentration. The cultures were aliquoted and frozen at-80 until thawed for use. The liquid PPFM preparations were made in-furrow.

Results

The analysis was conducted with JMP14 (SAS Institute), and the assumptions of normality and equal variance are tested prior to executing the Analysis of variance (ANOVA). ANOVA was conducted with the Analyze-Fit Model routine. Comparisons of isolates with the check within the same growth stage at application were performed with two-tailed t-tests applied to the pairwise differences between least-squares means estimated from the ANOVA model, under the null hypothesis that the difference in means was zero.

Across-locations analyses for the eleven locations were conducted according to the following model:

$$Y_{hijk}=M+I_i+S_j+IS_{ij}+L_h+R(L)_{k(h)}+LI_{hi}+IR(L)_{ik(h)}+LS_{hj}+LIS_{hij}+e_{hijk}, \quad [2]$$

where $Y_{hijk}$ is the yield at location h of isolate i at stage j in replicate k, M represents the overall mean, $I_i$ is the fixed effect of isolate i, $S_j$ is the fixed effect of stage j, $IS_{ij}$ is the fixed effect of the interaction of isolate i and stage j, $L_h$ is the random effect of location h, $R(L)_{k(h)}$ is the random effect of replicate k nested within location h, $LI_{hi}$ is the random effect of the interaction of location h and isolate i, $IR(L)_{ik(h)}$ is the random effect of the interaction of isolate i and replicate k nested within location h, $LS_{hj}$ is the random effect of the interaction of location h and stage j, $LIS_{hij}$ is the random effect of the three-way interaction of location h with isolate i and stage j, and $e_{hijk}$ is the random error.

The 4 PPFM isolates and the combination of isolates NLS0109 and NLS0017 tested in 2018 showed a higher yield response as compared to the untreated control.

TABLE 2

Mean yield in 2018 (Bold italics indicates a significant difference at p < 0.05 using Fisher's LSD test.)

| Treatment | Mean yield (Bu/A) | Yield difference from UTC (Bu/A) | Yield difference from UTC (%) | p-value v. UTC (Fisher's LSD test) | Win rate (# locs above UTC) |
|---|---|---|---|---|---|
| NLS0807 | 220.5 | +6.3 | +2.9% | *0.044* | 8/11 (73%) |
| NLS0662 | 218.1 | +3.9 | +1.8% | 0.21 | 7/11 (64%) |
| NLS0648 | 217.5 | +3.3 | +1.5% | 0.29 | 7/11 (64%) |
| NLS0109 | 216.9 | +2.7 | +1.3% | 0.39 | 7/11 (64%) |

TABLE 2-continued

Mean yield in 2018 (Bold italics indicates a significant difference at p < 0.05 using Fisher's LSD test.)

| Treatment | Mean yield (Bu/A) | Yield difference from UTC (Bu/A) | Yield difference from UTC (%) | p-value v. UTC (Fisher's LSD test) | Win rate (# locs above UTC) |
|---|---|---|---|---|---|
| NLS0109 + NLS0017 | 218.6 | +4.4 | +2.1% | 0.16 | 8/11 (73%) |
| UTC | 214.2 | — | — | — | — |

Example 2. Increases in Corn Yield by Application of *Methylobacterium* Compositions in 2017 Field Trials This trial assessed yield enhancement by *Methylobacterium* treatments compared to 2 UTC treatments. The *Methylobacterium* was applied as seed treatments with a target seed titer of 106 CFUs/seed for single isolate treatments. It included 6 locations. The trial was established using a Randomized Complete Block Design (RCBD) with 4 reps per location.

The Experimental Design and Methods were the same as Example 1.

All 4 *Methylobacterium* treatments produced higher yield than the UTC. The two UTC treatments (UTC-1 and UTC-2) showed very similar yields and were the two lowest-yielding treatments in the trial.

TABLE 3

Mean Yield in 2017. (P-values are taken from Dunnett's test.)

| Inoculation treatment | Yield (Bu/A) | Absolute difference from UTC mean (Bu/A) | % difference from UTC mean | Contrast p-value v. UTC mean (Dunnett's) | Locations above UTC (/6) |
|---|---|---|---|---|---|
| NLS0648 | 208.7 | +5.6 | +2.7% | 0.56 | 4 |
| NLS0662 | 212.8 | +9.7 | +4.8% | 0.11 | 6 |
| NLS0807 | 210.5 | +7.4 | +3.7% | 0.35 | 5 |
| NLS0109 + NLS0017 | 212.3 | +9.2 | +4.5% | 0.15 | 5 |
| UTC-1 | 203.7 | — | — | — | — |
| UTC-2 | 202.5 | — | — | — | — |
| UTC mean | 203.1 | — | — | — | — |

Example 3. Effects of *Methylobacterium* Strain NLS0807 (NRRL B-67743) Treatment of Corn on Nutrient Content Corn seeds were treated with *Methylobacterium* strain NLS0807 at a rate of 106 CFU per seed and grown in sterilized soil (30 seeds per flat) in a greenhouse in parallel with untreated corn seeds. At 22 days after planting (V2 growth stage), 15 or more plants per flat were chosen randomly and shoots were collected by cutting one inch above the soil line. The shoots were incubated in sample bags at 45° C. for 4 days to dry and analyzed for macronutrient and micronutrient content. A single-tailed unequal variances (Welch's) t-test was used to analyze the data to determine whether treatment with NLS0807 resulted in a significant increase in nutrient content. *Methylobacterium* NLS0807 significantly enhanced foliar content of four nutrients: phosphorus (P), potassium (K), iron (Fe) and manganese (Mn). Of the 12 nutrients tested, 9 were elevated over the UTC by treatment with NLS0807. Results are shown in Table 4.

TABLE 4

Mean nutrient contents on a dry weight basis, percent difference of NLS0807 from UTC, and contrast p-values. (Bold italics indicate p < 0.05.)

| Nutrient (units) | NLS0807 value | UTC value | % difference from UTC | Contrast p-value |
|---|---|---|---|---|
| Nitrogen (%) | 1.466 | 1.465 | +0.1% | 0.49 |
| NO3-N (%) | 0.0024 | 0.0021 | +14.3% | 0.17 |
| Phosphorus (%) | 0.227 | 0.201 | +12.9% | *0.0062* |
| Potassium (%) | 5.20 | 4.90 | +6.1% | *0.027* |
| Calcium (%) | 0.839 | 0.815 | +2.9% | 0.28 |
| Magnesium (%) | 0.254 | 0.251 | +1.2% | 0.38 |
| Sulfur (%) | 0.216 | 0.226 | −4.4% | 0.80 |
| Zinc (ppm) | 22.8 | 21.6 | +5.6% | 0.15 |

TABLE 4-continued

Mean nutrient contents on a dry weight basis, percent difference of NLS0807 from UTC, and contrast p-values. (Bold italics indicate p < 0.05.)

| Nutrient (units) | NLS0807 value | UTC value | % difference from UTC | Contrast p-value |
|---|---|---|---|---|
| Manganese (ppm) | 136.3 | 122.3 | +11.4% | *0.0092* |
| Iron (ppm) | 89.3 | 75.6 | +18.1% | *0.028* |
| Copper (ppm) | 6.13 | 6.33 | −3.2% | 0.73 |
| Boron (ppm) | 5.47 | 5.53 | −1.1% | 0.57 |

Example 4 Detection or Identification of *Methylobacterium* Strains, Variants and Derivatives Assays are disclosed for detection or identification of specific *Methylobacterium* strains and closely related derivatives. Genomic DNA fragments unique to a *Methylobacterium* strain are identified and qPCR Locked Nucleic Acid (LNA) based assays are developed.

Genomic DNA sequences of *Methylobacterium* strains are compared by BLAST analysis of approximately 300 bp fragments using a sliding window of from 1-25 nucleotides to whole genome sequences of over 1000 public and proprietary *Methylobacterium* isolates. Genomic DNA fragments are identified that have weak BLAST alignments, indicative of approximately 60-95% identity over the entire fragment, to corresponding fragments of a *Methylobacterium* of interest. Fragments from the NLS0109 genome corresponding to the identified weak alignment regions were selected for assay development and are provided as SEQ ID NOS: 1-3.

TABLE 5

Target Fragment Sequences of NLS0109

| Fragment | SEQ ID NO | Sequence |
|---|---|---|
| ref1_135566 | 1 | ACGGTCACCCCACGGACTGGGCGAGTACCTCACCGGTGTTCTA TCATAACGCCGAGTTAGTTTTCGACCGTCCCTTATGCGATGTA CCACCGGTGTCGGCAGCCGATTTCGTCCCACCGGGAGCTGGCG TTCCGGTTCAGACCACCATCATCGGTCACGATGTCTGGATTGG ACACGGGGCCTTCATCTCCCCCGGCGTGACTATAGGAAACGGC GCGATCGTCGGGGCCCAGGCGGTCGTCACAAGAGATGTCCCA CCCTATGCGGTAGTTGCTGGCGTCCCCGCGACCGTACGACGAT |
| ref1_135772 | 2 | CCAATAAAAGCGTTGGCCGCCTGGGCAACCCGATCCGAGCCT AAGACTCAAAGCGCAAGCGAACACTTGGTAGAGACAGCCCGC CGACTACGGCGTTCCAGCACTCTCCGGCTTTGATCGGATAGGC ATTGGTCAAGGTGCCGGTGGTGATGACCTCGCCCGCCGCAAGC GGCGAATTACTCGGATCAGCGGCCAGCACCTCGACCAAGTGT CGGAGCGCGACCAAAGGGCCACGTTCGAGGACGTTTGAGGCG CGACCAGTCTCGATAGTCTCATCGTCGCGGCGAAGCTGCACCT CGA |
| ref1_169470 | 3 | CGATGGCACCGACCTGCCATGCCTCTGCCGTCCGCGCCAGAAT GGTAAAGAGGACGAAGGGGGTAAGGATCGTCGCTGCAGTGTT GAGCAGCGACCAGAGAAGGGGGCCGAACATCGGCATCAAACC TCGATTGCCACTCGGACGCGAAGCGCGTCTTGAAGGAGGGAT GGAAGCGAAACGGCCGCAGAGTAACCGCCGACGAAAGATTGC ACCCCTCATCGAGCAGGATCGGAGGTGAAGGCAAGCGTGGGT TATTGGTAAGTGCAAAAAATATAATGGTAGCGTCAGATCTAGC GTTC |

Regions in SEQ ID NOS: 1-3 where corresponding regions in other *Methylobacterium* strains were identified as having one or more nucleotide mismatches from the NLS0109 sequence were selected, and qPCR primers designed using Primer3 software (Untergasser et al. (2012), Koressaar et al. (2007)) to flank the mismatch regions, have a melting temperature (Tm) in the range of 55-60 degrees, and to generate a PCR DNA fragment of approximately 100 bp. The probe sequence was designed with a 5′ FAM reporter dye, a 3′ Iowa Black FQ quencher, and contains one to six LNA bases (Integrated DNA Technologies, Coralville, Iowa). At least 1 of the LNA bases is in the position of a mismatch, while the other LNA bases are used to raise the Tm. The Tm of the probe sequence is targeted to be 10 degrees above the Tm of the primers.

Primer and probe sequences for detection of specific detection of NLS0109 are provided as SEQ ID NOS: 4-12 in Table 6. Each of the probes contains a 5′ FAM reporter dye and a 3′ Iowa Black FQ quencher.

TABLE 6

Primer and Probe Sequences for Specific Detection of NLS0109

| Primer/Probe | SEQ ID NO | Sequence* |
|---|---|---|
| NLS0109_ref1_135566_forward | 4 | CCTCACCGGTGTTCTATCATAAC |
| NLS0109_ref1_135566_reverse | 5 | CCGATGATGGTGGTCTGAAC |
| NLS0109_ref1_135566_probe | 6 | CGTCCCTTATGCGATGTACCA |
| NLS0109_ref1_135772_forward | 7 | GATCCGAGCCTAAGACTCAAAG |
| NLS0109_ref1_135772_reverse | 8 | GACCAATGCCTATCCGATCAA |
| NLS0109_ref1_135772_probe | 9 | AACACTTGGTAGAGACAGCC |
| NLS0109_ref1_169470_forward | 10 | AAGGAGGGATGGAAGCGAAAC |
| NLS0109_ref1_169470_reverse | 11 | ATAACCCACGCTTGCCTTC |
| NLS0109_ref1_169470_probe | 12 | CGCAGAGTAACCGCCGACGAA |

*Bold and underlined letters represent the position of an LNA base

Use of Primer/Probe Sets on Isolated DNA to Detect NLS0109 and Distinguish from Related *Methylobacterium* Isolates Each 10 ul qPCR reaction contains 5 ul of Quantabio PerfeCTa qPCR ToughMix 2× Mastermix, Low ROX from VWR, 0.5 ul of 10 uM forward primer, 0.5 ul of 10 uM reverse primer, 1 ul of 2.5 uM probe, 1ul nuclease free water and 2 ul of DNA template. Approximately 1ng of DNA template is used per reaction. The reaction is conducted in a ThermoFisher QuantStudio™ 6 Flex Real-Time PCR System with the following program: 95° C. for 3 min, then 40 cycles of 95° C. for 15 sec and 60° C. for 1 min. The analysis software on the PCR instrument calculates a threshold and Ct value for each sample. Each sample was run in triplicate on the same qPCR plate. A positive result is indicated where the delta Ct between positive and negative controls is at least 5.

Use of the three primer/probe sets to distinguish NLS0109 from closely related isolates by analysis of isolated DNA is shown in Table 7 below. The similarity score shown for the related isolates takes into account both the average nucleotide identity and the alignment fraction between the isolates and NLS0109. One of the tested strains, NLS0730, was used as an additional positive control. NLS0730 is a clonal isolate of NLS109 which was obtained from a culture of NLS0109, which was confirmed by full genome sequencing as identical to NLS0109, and which scored positive in all three reactions. The similarity score of greater than 1.000 for this strain is likely the result of a slightly different assembly of the genome for this isolate compared to NLS0109. The delta Ct of approximately 15 or more between the NLS0109 and NLS0730 isolates and the water only control is consistent with the sequence confirmation of the identity of these isolates. Analysis of other isolates that are less closely related to NLS0109 results in delta Ct values similar to those for the water only control.

TABLE 7

| | Similarity score to | Average Ct Value | | |
|---|---|---|---|---|
| NLS# | NLS0109 | Ref1_135566 | Ref1_135772 | Ref1_169470 |
| NLS0730 | 1.005 | 21.08 | 21.31 | 20.35 |
| NLS0109 | 1 | 21.97 | 22.62 | 22.08 |
| NLS0731 | 0.181 | No Ct | 37.85 | >37.91 |

TABLE 7-continued

| | Similarity score to | Average Ct Value | | |
|---|---|---|---|---|
| NLS# | NLS0109 | Ref1_135566 | Ref1_135772 | Ref1_169470 |
| NLS0644 | 0.87 | >36.8 | >38.31 | No Ct |
| NLS0700 | 0.88 | >38.36 | >38.36 | >38.44 |
| NLS0710 | 0.894 | No Ct | >37.47 | >38.13 |
| NLS0834 | 0.852 | 37.81 | No Ct | 37.97 |
| NLS0939 | 0.862 | 37.94 | 38.37 | >38.35 |
| NLS0947 | 0.807 | 38.44 | No Ct | No Ct |
| NLS1015 | 0.894 | 38.77 | No Ct | >37.91 |
| NLS1217 | 0.872 | 37.64 | 37.20 | 37.96 |
| H2O only | | >38.14 | >35.92 | >37.12 |

Use of Primer/Probes for Detection of NLS109 on Treated Plant Materials.

For detection of NLS0109 foliar spray treatment on corn: Untreated corn seeds were planted in field soil in the growth chamber and watered with non-fertilized R.O. water. After plants germinated and grew for approximately 3 weeks, they were transferred to the greenhouse. At V5 stage, plants were divided into 3 groups for treatment: foliar spray of NLS0109, mock foliar spray, and untreated. Plants receiving the foliar spray of NLS0109 were treated with 10× glycerol stock at the rate of 71.4 ul per plant using Solo sprayers. This converts to the rate of 10 L/acre in the field. Mock treated plants were sprayed with 71.4 ul water/plant. Untreated plants received no foliar spray treatment. Leaves were harvested two weeks after foliar spray treatment into sterile tubes and DNA from bacteria on the harvested leaves is isolated as described above. Each experiment was grown at least 2 times. As shown in Table 8, NLS0109 is detected on leaves harvested from corn plants treated by a foliar spray application of the *Methylobacterium* strains using all 3 primer probe sets, as demonstrated by delta Ct values of approximately 10 between the sample and the negative controls.

TABLE 8

| Treatment | Average Ct Value | | |
|---|---|---|---|
| | Ref1_135566 | Ref1_135772 | Ref1_169470 |
| Control (no application) | 32.43 | 32.10 | 31.55 |
| Control (mock application) | 35.54 | 35.34 | 34.80 |
| NLS0109 (10 L/acre equivalent) | 23.36 | 22.88 | 22.66 |

The above results demonstrate the use of genome specific primers and probes to detect *Methylobacterium* strain NLS0109 on various plant tissues following treatment with the strains and provide methods to distinguish NLS0109 from closely related isolates. Similar methods are developed for additional *Methylobacterium* strains, NLS0017, NLS0807, NLS0662 and NLS0648 using target sequence fragments and primer/probe pairs as shown in the Tables below.

TABLE 9

Target Fragment Sequences of NLS0017

| Fragment | SEQ ID NO | Sequence |
|---|---|---|
| ref4_930 | 13 | GCAAAACGACCTAATAGTTCTACAGCGGCATGCGCCAAGT CAGCGCGGTGAACAGTATACCTGGGAGCAACTTGTCCTCC GAAACCCACATAAAACAAATTACTCCTGGCAGTGCCCAGT CCATCAAAATCGAATACAATATTTCTCGAGGAGGCATCTGT AATAGCCTGCCAAAGCAACAAAGCTATGGCGCCGTTATGA CTTTCATTGCTTCTGGTAGACATAAAATAATATGCCGATTT GTGATCCCAAATGTAGAATATTGCCGCATCAATTGCGCCAA GTTTATTTCGGATCGAT |
| ref1_142021 | 14 | GGCGCCAACGGTATGATCGCATGATTTTCCTGCGGCATAGC TTGCGGGAATGGCGTATTTGGCGCTCTCCTCAGGAATTTCT AAGGGCATACGCAGGAACTCTACAGCACTTTTACTGGTATT TTGTAGTGACAGCGGAGGAGGCTGGTGCTCAAGGTAATCG TGATGAAGTGATCCGGGCCATTCGGGGCGCGTTTCTAGTCT TTCCAATCCGCGCCCTGTACCACGTATTACGCCGGACCGGT CTGCGCCGCGCCGCCCTCTTGACCGCCCTAAATGTCTAAGA GCGTCTAACAAAGC |
| ref1_142636 | 15 | GACGATATCGCTCATCTTCACTGCATTGAAGCTGGTGCCGT ACTGCATAGGGATGAAAAAGTGATGCGGATAGACGGCTGA CGGGAAAGCGCCTGGTCGATCGAAGACTTTGCTGACGAGG TTGTGGTAGCCCCGGATATAGGCATCGAAGGCCGGGACGT TGATCCCATCCTTTGCCTTATCTTGACTGGCGTCGTCGCGTG CCGTCAGAACGGGCACGTCGCAGGTCATCGAGGCCAGCAC CTTGCGGAACACCTGCGTTCCGCCGTTGGGATTATCGACGG CGAACGCGGTGGCCGC |

TABLE 10

Primer and Probe Sequences for Specific Detection of NLS0017

| Primer/Probe | SEQ ID NO | Sequence* |
|---|---|---|
| NLS0017_ref4_930_forward | 16 | GTCCTCCGAAACCCACATAAA |
| NLS0017_ref4_930_reverse | 17 | CTACCAGAAGCAATGAAAGTCAT |
| NLS0017_ref4_930_probe | 18 | TCTGTAATAGCCTGCCAAAGCA |
| NLS0017_ref1_142021_forward | 19 | GGCTGGTGCTCAAGGTAAT |
| NLS0017_ref1_142021_reverse | 20 | ACATTTAGGGCGGTCAAGAG |
| NLS0017_ref1_142021_probe | 21 | ATGAAGTGATCCCGGGCCAT |
| NLS0017_ref1_142636_forward | 22 | CCGTACTGCATAGGGATGAAA |
| NLS0017_ref1_142636_reverse | 23 | TAAGGCAAAGGATGGGATCAA |
| NLS0017_ref1_142636_probe | 24 | TTGCTGACGAGGTTGTGGTAG |

*Bold and underlined letters represent the position of an LNA base

TABLE 11

Target Fragment Sequences of NLS0807

| Fragment | SEQ ID NO | Sequence |
|---|---|---|
| ref1_458355 | 25 | CAACTATGTAGACCCGACGGTGCGATTTCACTTCGCAAAGCCG CAGGGCAGCACCCTTGCGCTCAATGTTGACGCCAGCGTGATCT ATACTATTACCGTCACGCACACGCAGGGCGGCGTACAGATTCA TCGCGAGAGTAAGAACCACCATCAGACCATCACGCGCAGCGA CCTGAGCAAGCAGTTCGGCGTTGGTGTGGCCGACCAGCTGAC GCGCGATCAGGTCATGAAGGTGATCGAGTCGGCATTTCGCGA CGCTACCCGCTAAGATCGGCGCCCACGAAACGCTACGAGACT AGG |
| ref1_459688 | 26 | AGCCGGCATCTTGTTCAAGGCGCTCACCTCGACGCCGACGCTG TAGGCGACTTGAGAGGGCGTCTCATATGAACGAAGCATCTTCG CGTAGAGAACCTTCTTGTTCTCCTGCGTGATGTTCGCTTTGCAG ACGTTGACTGCCGCCATGAACGCCGAAGCCTTGCGCGCTTCAT CGTAATCGCCTGCGAAGGCGGGTAGTGAAAAGCTTAGTGCAA TGGCAAACACAGCCGCCGAACGTCGCATGGTATCCGTCCCCG ATTGACGGCAGTGCCGCCATATCTCGGCTTTAGCAGAGCTGAT |
| ref1_3158527 | 27 | AACCTGCGCCGGCCGAGGTTTCGCGAGCCGTCGCCACGGGCA ACGCCTCGCCCGCGATGTGCAAAAAAGTCCCCGGCACTTCGCG CCGTCGTCCGATCCACGACCGCGAATTTCTCAACGAGTACAAG GTGCTTATGGGAGATCCGAGCGTCCGTCCCGGAGCCCGAGAC CGCGCGGCCCGAGTAATAGGCGAAAAAGACTCCTACTCCTCG GGCTTCTCGGGCCCCCTCAGCAACATCTACGCTTGCCGCCCAT CACCCTGGCGGGAGATCAGCGACGAGACACAGGCCCACTTCG CCC |

TABLE 12

Primer and Probe Sequences for Specific Detection of NLS0807

| Primer/Probe | SEQ ID NO | Sequence* |
|---|---|---|
| NLS0807_ref1_458355_forward | 28 | TTGACGCCAGCGTGATCTATAC |
| NLS0807_ref1_458355_reverse | 29 | GTGATGGTCTGATGGTGGTTCT |
| NLS0807_ref1_458355_probe | 30 | TATTACCGTCACGCACACG |
| NLS0807_ref1_459688_forward | 31 | CTTCGCGTAGAGAACCTTCTTGTT |
| NLS0807_ref1_459688_reverse | 32 | CTTCGCAGGCGATTACGATGAA |
| NLS0807_ref1_459688_probe | 33 | CGTGATGTTCGCTTTGCAGA |
| NLS0807_ref1_3158527_forward | 34 | CCGCGAATTTCTCAACGAGTACA |
| NLS0807_ref1_3158527_reverse | 35 | GCCCGAGGAGTAGGAGTCTTT |
| NLS0807_ref1_3158527_probe | 36 | AGGTGCTTATGGGAGATCCG |

*Bold and underlined letters represent the position of an LNA base

Use of the primer/probe sets to distinguish NLS0807 from closely related isolates by analysis of isolated DNA is shown in Table 13 below. The similarity score shown for the related isolates takes into account both the average nucleotide identity and the alignment fraction between the isolates and NLS0807. Two of the tested strains, NLS0821 and NLS0044, were used as additional positive controls since a similarity score of 1.00 indicates they are nearly identical to NLS0807. Consistently low Ct values from qPCR using NLS0807 as the DNA template and no detection in the water only control is consistent with the sequence confirmation of the identity of these isolates. Analysis of other isolates that are less closely related to NLS0807 results in no detection similar to those for the water only control.

TABLE 13

| | Similarity | Average Ct Value | | |
|---|---|---|---|---|
| NLS# | to NLS0807 | ref1_ 459688 | ref1_ 3158527 | ref1_ 458355 |
| NLS0807 | 1.00 | 22.39 | 24.09 | 23.10 |
| NLS0821 | 1.00 | 22.49 | 24.04 | 22.96 |
| NLS0044 | 1.00 | 22.49 | 23.86 | 22.90 |
| Strain A | 0.95 | UDT | UDT | UDT |
| Strain B | 0.94 | UDT | UDT | UDT |
| Strain C | 0.93 | UDT | UDT | UDT |
| Strain D | 0.93 | UDT | UDT | UDT |
| water only (neg control) | — | UDT | UDT | UDT |

TABLE 14

Target Fragment Sequences of NLS0648

| Fragment | SEQ ID NO | Sequence |
|---|---|---|
| ref1_1185955 | 37 | AGTCATTGATCAAGCAACCCCTATTGAGTTGGATATCGAAGGA<br>TCAAGGTCGCGTCAATAGATGCATCTATCAGGCCAAATGTCGC<br>TTTTCAAGAATGGCTCTTTCGAAGCTATCTTTATAATCGCTCGC<br>CATTCTCTCATTACCAAAATCGACCTTAACTAGCTCGACATTG<br>ATGCGAGCAGCTCCGGCAAACGAGGAGAGATTGACCTTAAAG<br>GAATTGAACGCCTCAAGCAATTCAGACACATTACCAGGAGTG<br>CTATAGCAACAACCAGACCCATATCGGTCAATAACCTCTTTTA |
| ref1_3282585 | 38 | CGCAAAACGATTTATCACTGCCATCTTGTTGTTTGATAACCCTT<br>TTTTACCAGACGTTATGCTGGGCGAGAAAGAGGACTAGCAGA<br>TCGGAGCGGTATCGCGATTTTTCGGTAGTTCGCGCCTACAACA<br>GGATAAGATCCGATAGTGAAGCAACATGGCTGTTTTTTGATTT<br>GTAAGTCAGCAACTTAAGCAGCCAGCCTATCTGCCGTCGCAGA<br>CGCTTGAGGCATCGGGCAGCATCTTAGAAAAGGTGGCAGTAA<br>TTGCCACAGCGGAACGTAGCGGCACGGATAAGCACGCAGGGT<br>C |
| ref1_4194637 | 39 | CCCATCTGGACCCAATATCCCCTTCATCGACAATTCCCGAGTA<br>AGTGTGGGTTCGAGGATTTCGCGAAACAGCCTTGTTCGTTCCT<br>CCGGCCTTAAAATTGGCGTGCCGTCGGGAGATCGATAGGCATC<br>CCTTACCTGCCTTTCGACCGCCGGCACACGCGCCGGTCGTC<br>GTGTTCACGGCCACGGAATGGACGAAGGTGCGCCGCTCATTTC<br>GCTCGTTTGCCGTCTCCACCATCCAGGAGGCCAGCAGGACGGT<br>TTCGTCTCGACCGCCGGTCACACACACCGCAAGGGACTCAGG |

TABLE 15

Primer and Probe Sequences for Specific Detection of NLS0648

| Primer/Probe | SEQ ID NO | Sequence* |
|---|---|---|
| NLS0648_ref1_1185955_forward | 40 | TCGCTCGCCATTCTCTCATTAC |
| NLS0648_ref1_1185955_reverse | 41 | AGGTCAATCTCTCCTCGTTTGC |
| NLS0648_ref1_1185955_probe | 42 | TCGACATTGATGCGAGCA |
| NLS0648_ref1_3282585_forward | 43 | TTCGCGCCTACAACAGGATAAG |
| NLS0648_ref1_3282585_reverse | 44 | CAGATAGGCTGGCTGCTTAAGTT |
| NLS0648_ref1_3282585_probe | 45 | TCCGATAGTGAAGCAACA |
| NLS0648_ref1_4194637_forward | 46 | GAGTAAGTGTGGGTTCGAGGATTT |
| NLS0648_ref1_4194637_reverse | 47 | AGGTAAGGGATGCCTATCGATCT |
| NLS0648_ref1_4194637_probe | 48 | CGGAGGAACGAACAAGGC |

*Bold and underlined letters represent the position of an LNA base

TABLE 16

Target Fragment Sequences of NLS0662

| Fragment | SEQ ID NO | Sequence |
|---|---|---|
| NLS0662_ref1_4871392 | 49 | ACCTGCTAAAATCACGTCCTCTCAGATTGAAAAAT<br>CATTGAAGAAACGTGTCGAACGATTGCCGGGGATT<br>ATGACGTTAGATCAATTGAAAAATACAAGCTTTGA<br>AATTGAGTTACAGCCAAAAGATGCCCCGGATCCGG<br>ACCCATCAGACTTCGGTGGCTAGTTCGAGCCAAAC<br>TCGAACGTCGCCATGGCGCGCAAGTCGCAATACCA<br>TTTCACAGCGCAGCGGTTATTTCGTTGTACACTGTA<br>GCAATGCGTCGGCTTGCGCGCTTCCGCTGGCGATC<br>AAAGGTCCGCCGATTTACG |

TABLE 16-continued

Target Fragment Sequences of NLS0662

| Fragment | SEQ ID NO | Sequence |
| --- | --- | --- |
| NLS0662_ref1_1266930 | 50 | TCCCGAACATACAATGGAGGAAGCGTGTGGTAGGC<br>CAATTTGTAACGAAATATGGCATCGGTCACGGCTC<br>TCTCAATAAATTCGATCTCAAGTCTTCTGAACGAG<br>CATGCCTCATCCTTATCCTGAGCGAACGCCTGCCA<br>GTTTGCAGTCATTCCAACATACATAGCCAAAAAGG<br>CGAGGTAGACCTTCATACGGGCACCTCAATCGTCC<br>CCATTCGTTCAAGCTCCTTCAAGATAACAGCCGCA<br>CCACATTGCTGAGATCGAAGATTCGGATCAAATAT<br>TCCATCAAATTTATACTTTC |
| NLS0662_ref1_17614 | 51 | GCATCCTTTGCGCTCGCAGGCCTAAGGTCAAGCCC<br>GGTTACTTCGTTTGGTAGAACGAGGTAGACGATGC<br>CTAGTCTTAAGGTGGCCCATGTTAACCAACAGGGC<br>CAGAACATGATTATAGTTCCGTTAGATGCCAACTT<br>CGGTTACAAAACCGATGGTGAGCAGTCCGACATCA<br>TGTTCGAAATACAGGACGCGGCGCGGTCCGCCGGT<br>CTTGCGGGTGCCGTAGTAGCGTTCTGGCAGTCAGG<br>TGGACAAACCCGTTTCCGGGGCCCGGCTCCGTGGC<br>ACCCATTCCTTCGCAGCCTC |

TABLE 17

Primer and Probe Sequences for Specific Detection of NLS0662

| Primer/Probe | SEQ ID NO | Sequence* |
| --- | --- | --- |
| NLS0662_ref1_4871392_forward | 52 | GCGCAAGTCGCAATACCATTTC |
| NLS0662_ref1_4871392_reverse | 53 | CGTAAATCGGCGGACCTTTGA |
| NLS0662_ref1_4871392_probe | 54 | CGCAGCGGTTATTTCGTTG |
| NLS0662_ref1_1266930_forward | 55 | ACGAGCATGCCTCATCCTTATC |
| NLS0662_ref1_1266930_reverse | 56 | CGATTGAGGTGCCCGTATGAA |
| NLS0662_ref1_1266930_probe | 57 | TGCCAGTTTGCAGTCATTCC |
| NLS0662_ref1_17614_forward | 58 | CCCGGTTACTTCGTTTGGTAGAA |
| NLS0662_ref1_17614_reverse | 59 | CGAAGTTGGCATCTAACGGAACTA |
| NLS0662_ref1_17614_probe | 60 | TGGCCCATGTTAACCAACAG |

*Bold and underlined letters represent the position of an LNA base

Use of Primer/Probes for Detection of NLS0807 on Treated Plant Materials

Detection of NLS0807 from in-Furrow Treated Corn Roots

At planting, corn seeds in soil were drenched with NLS0807 and control strains from frozen glycerol stock to simulate in-furrow treatment. To obtain a final concentration of $10^7$ CFU/seed, 100 ul of each strain at $10^8$ CFU/ml is inoculated onto each seed placed in the dibble holes in soil. A 1/10 dilution series is made for lower concentration targets. For control treatment, 100 ul Milli-Q water is applied to each corn seed placed in the dibble holes in soil. Pots containing treated seeds are placed in a growth chamber for approximately two weeks and watered with unfertilized RO water every 1-2 days to keep soil moist. After 2 weeks of growth, roots of about 9 plants per replicate sample were harvested into sterile tubes. Each treatment had at least 2 replicate samples in each experiment, and each experiment was conducted at least 3 times.

DNA from bacteria on the harvested corn roots is isolated as follows. Individual roots are submerged in 20 mL of phosphate-buffered saline (PBS) (137 mM NaCl, 10 mM Phosphate, 2.7 mM KCl, and a pH of 7.4) in 50 mL conical tubes. Tubes are vortexed for 10 minutes, and then sonicated for 10 minutes. Root tissue is removed, and the remaining supernatant from multiple roots of the same sample are combined and centrifuged at 7500×g for 10 minutes. This process is repeated until there is one tube for each sample. The moist soil pellet is vortexed until it evenly coats the tube wall. Tubes are placed into a laminar flow hood with caps removed and open ends of the tubes facing the air blowers. Once dry, samples are stored at room temperature. 250 mg dried soil is used as input for DNA extraction using Qiagen DNeasy PowerSoil HTP 96 kit (Cat #12955-4) using manufacturer protocols.

Primers and probes for NLS0807 disclosed in Table 12 above are used in qPCR reactions to detect the presence of NLS0807 specific fragments provided in Table 11. Each 10 ul qPCR reaction contains 5 ul of Quantabio PerfeCTa qPCR ToughMix 2× Mastermix, Low ROX from VWR, 0.5 ul of 10 uM forward primer, 0.5 ul of 10 uM reverse primer, 1 ul of 2.5 uM probe, 1ul nuclease free water and 2 ul of DNA template. Approximately 1ng of DNA template is used per reaction. The reaction is conducted in a ThermoFisher QuantStudio™ 6 Flex Real-Time PCR System with the following program: 95° C. for 3 min, then 40 cycles of 95° C. for 15 sec and 60° C. for 1 min. The analysis software on the PCR instrument calculates a threshold and Ct value for each sample. Each sample is run in triplicate on the same qPCR plate. A positive result is indicated where the delta Ct between positive and negative controls is at least 5.

Use of Primer/Probes for Detection of Variants of Additional Table 1 *Methylobacterium* isolates Variants of *Methylobacterium* isolates listed in Table 1 are identified by the presence of DNA fragments as described above. Unique fragments for use in such methods are provided in Table 18.

TABLE 18

| Strain | Fragment | SEQ ID NO | Sequence |
| --- | --- | --- | --- |
| NLS0020 | ref3_25009 | 61 | GCCCTTCTGTCAGGCGATATTGTATAATGGCGTT GCCCCAATAGAAGCAGCCATTCGTGCGAGGGCA GCAGCGACGCTAGGTCGAAAGAGCATCCTAATCT CGATCAAGATGCGACTGAGATTTCTGATGAAAAT ATCTAGACACAAGCAAAGCTGGTGAAATTACAA CGATCATGGCGACAATTGCGGCCAATTCGGCCGG AACTTGAAGGAACATAAAAATGAATATTACAAA TATACCGCAAAGCATGTAGAGTTGCTACACCAAG GGTCGGGACGTCCAAAAAAACTCACTGAGGA |
| NLS0020 | ref3_25219 | 62 | GGAACATAAAAATGAATATTACAAATATACCGC AAAGCATGTAGAGTTGCTACACCAAGGGTCGGG ACGTCCAAAAAAACTCACTGAGGAAGTCGACTG GAAGCACGAGGCGCCCCCCCCAGGAGCGGGGCG ACCGGCAAGGGGGCCCGCAATTGTCGCCATGATC GACCAGCTTAGGTAGGATCCTCTTTCGACCTAAC GAATGGCTGCTTCTATTGGGGCAACGCCATTATA CAATATCGCCTGACCATCTGGAACGCGGCCCGGT CCACCGGCAGGTTGGCGACGACAGCGTCGGAG |
| NLS0020 | ref1_4361220 | 63 | CGGCGTCGACCAGCCGGGCGAACTGCTTGGGCAT GCTCTCCCGCGACGCCGGCCACAGCCGCGTCCCC GTCCCTCCGCACAGGATCATCGGGTGGATTTGAA AGGCAAAACGGGACATCAGGATAGGCCGCTCAG GCGTTGGCGCTGAGGCGCTTGATGTCGGCGTCGA CCATCTCGGTGATCAGCGCCTCGAGGCTGGTCTC GGCCTCCCAGCCGAAGGTCGCCTTGGCCTTGGCG GGGTTGCCCAGCAGCACCTCGACCTCTGCCGGCC GGAACAGCGCCGGGTCGACGATCAGGTGG |
| NLS0020 | ref1_4602420 | 64 | CTGGACATGCGCCCACCCCGGCCAAGTCCGACCG CACCGGCAACCGCTCCTGTAGTCGTCGTCATCGT TCTCACCCCTGAGGCGGAGACCGTCCGCTAACGG GGTGTCTCAAGCAACCGTGGGGCGGAGGAACAC GCACGTAGTCGCGTTTCAAGGTTCGCACGAACGC CTCGGCCATGCCGTTGCTCTGCGGGCTCTCCAGC GGCGTCGTTTTTGGCACCAAACCAAGGTCGCGGG CGAAGCGGCGCGTGTCGCGGGGACTGTCAGGAA TTTCGTGTGGGGGCGGCCATAGTGGATCCG |
| NLS0089 | ref1_194299 | 65 | GGAAATCGGCTTCAAGTACGACGTCACGCCGGCC ATGCAGGTCACGGGTGCACTGTTCAATCTCGAGC GCGACAACCAGCCGTTCCCCTCGAACGTGGAGTC CGGCCTCGTCCTTGGCGCAGGTCAGACACGCACC CAGGGCGCGGAAATCGGCCTGGCCGGCTATCTAA CCGATTGGTGGCAGGTCTTTGGCGGCTACGCTTA TACCGAGGCACGCGTACTCTCGCCACTGGAAGAC GATGGAGACGTGATCGCAGCAGGTAATCTCGTCG GCAACGTTCCGCTAAATACTTTCAGTCT |
| NLS0089 | ref1_194305 | 66 | CGGCCTGGCCGGCTATCTAACCGATTGGTGGCAG GTCTTTGGCGGCTACGCTTATACCGAGGCACGCG TACTCTCGCCACTGGAAGACGATGGAGACGTGAT CGCAGCAGGTAATCTCGTCGGCAACGTTCCGCTA AATACTTTCAGTCTGTTCAACAAGTTCGATATCA ACGAGAATTTCTCCGTTGCTCTGGGCTATTACTAT CAGGATGCCAGCTTTGCCTCCTCAGACAATGCAG TGCGTTTGCCAAGTTATTCGCGGTTCGATGGCGG GTTGTTCTATCGATTCGACGAGTTGAC |
| NLS0089 | ref1_194310 | 67 | ACGTTCCGCTAAATACTTTCAGTCTGTTCAACAA GTTCGATATCAACGAGAATTTCTCCGTTGCTCTG GGCTATTACTATCAGGATGCCAGCTTTGCCTCCTC AGACAATGCAGTGCGTTTGCCAAGTTATTCGCGG TTCGATGGCGGGTTGTTCTATCGATTCGACGAGT TGACACGCGTTCAGCTTAGCGTCGAGAACATTTT CGACAGGCGTTACATCATCAACTCCAACAACAAC AACAACCTCACGCCTGGCGCGCCGAGAACAGTCC GCGTGCAATTGATCGCTCGGTTCTAAA |
| NLS0042 | ref1_86157 | 68 | AGCCCACAAGCCTGATGCACTTAACTACATCCTC TAATGTCGCGCCAATTTGCTTGGCGGCAGGGGAT GTTGTATCGTCATAGGCTTGTCTAACCGGAACTT GTTTGCCAATCTCTTTGGCGATCGCAACCGCCAT CTCGTGTTCGTCAACCATGTGCGCGTTCCTCTAAT TGCACTCATGGTGCCACGTGCACCTCCGATCGTC |

TABLE 18-continued

| Strain | Fragment | SEQ ID NO | Sequence |
|---|---|---|---|
| NLS0042 | ref1_142469 | 69 | TCGTGTCTAGAATGAAGGTGGGAACAACCTTACA CAGGCTTTCGCGACGCGCGAATTTCTGGTTTCTCC GCCTCGGATGTGGGTTTGAGCGCTTC CTTTTCATTTGTCATGATCTCGACCAAGGTATTCA CGGCAAGCTCGGTCTGTTGCTTAGCAAGTGCCTG AACTTCGCGAACGATCGGCTCTCGACCCTTCGGG TTCGAGACCTGTCCCTTTTGAAAACCACGTGCCC TACACTTTTCGGGATCAAGGTGCGGGTTGGCTTT GGTCAAAATTCTCTGGCGTCCCATTACACGCCCT CCGCATCATCGTTCCCGCGAACGATCTGACCCCC GACTTCCGCGAGGAAGCGTGTGGCGTGATCCTCG AAGCGGAATGCCACCTCGAACTGTTCC |
| NLS0042 | ref1_142321 | 70 | CAGCAGCAAGCAGATCGTTGAAAACCGCTTGAA CCGCATCTTGATCGGGACCGGAACCAATCAGGTC ATCTAGGTAAACCGAGACGTAAACTCGTTTGCGC TCGGCATCTTTCAGAACGTCCGTGATGCCAGACC GCATTAGTACCATCGTCGCCAAGGCGGGCGACTG AACGAAGCCGATCGGCAGAGAGTAACGGGGACC GCCCCTAATCGGGTTGCGAACGCAAGACCACTTA GCAAAGGTTCGAGCACGGCCGAACTTCGCATGGT GGAGAGCCGCGGCAACACGGTTCCGTGATA |
| NLS0064 | ref1_153668 | 71 | TAGACATTCCAACAAACCGGCAAGAGGCTCGTCC TCACTCGAGGATTTGTTGGGACTTGCATGATGTC GAAGCGGAGCCGTTATGACCTGGGTGCGATCATG CGCCGAGCATGGGAGATGGCTCGGGAGGCGGCA TTCGCGGTTGGCGAGCGGGCACGGACTCACCTTG CTGCCGCGATGCGCAGCGCGTGGGCCGAAGCCA AGTTGGCACTCGCGCCCACGAAGACGGAGCAGG ATCGTCTCTCCGAGCGACATGATCGGACATGA GGACGCCTACCAAGGCCGGGTTCTAAAATAT |
| NLS0064 | ref1_3842117 | 72 | AAGATGGATACGACAAGCGCGATTACATTATTTG CGAAATAGATGGACAAATAAAAGACAAAGGACT GATGTATTTCCTTAAATCTGGACAAGTTGACCTCT TTCACATAGAAGTCACCACTCCCTTTGGGACAAT TTGGTGTCACGAAAACATAGAGGCCGAACTTCTT AGCTGAATTATCGCGCTCCGGGTTCTTATGCGGC TGAGTGAAGCGCGGGACAGCTTGCGAGCAGGGC CGCCAATGGCAGCCGGGATGACACAATGCTCGGT CTCCCGACGCTTCTTCAATCGGGAGCGCT |
| NLS0064 | ref1_3842278 | 73 | AGCTGAATTATCGCGCTCCGGGTTCTTATGCGGC TGAGTGAAGCGCGGGACAGCTTGCGAGCAGGGC CGCCAATGGCAGCCGGGATGACACAATGCTCGGT CTCCCGACGCTTCTTCAATCGGGAGCGCTTCGCA GCCCGGGGCGGCGCGCTCATGCGTCACGACCTGG GCCCTGCGCACCTTCGCGGCCCCGCCGTCCCGGC AGATCCCTGATGCCCCAAGTGGGCGGCCACTCCA TCAAAGAACCCCGGCCTGTGGCAGATCTCGTAGG CATACCGAGGTTCCGCAGTGCCCCACC |

REFERENCES

Altschul S. F., Gish W., Miller W., Myers E. W., Lipman D. J. (1990) Basic local alignment search tool. *J. Mol. Biol.* 215:403-410

Bentley D. R., Balasubramanian S., Swerdlow H. P., Smith G. P., Milton J., Brown D. G., Hall K. P., Evers D. J., Barnes C. L., Bignell H. R. et al. (2008) Accurate whole human genome sequencing using reversible terminator chemistry. *Nature* 456:53-59.

Caporaso J. G., Lauber C. L., Walters W. A., Berg-Lyons D., Huntley J., Fierer N., Owens S. M., Betley J., Fraser L., Bauer M., Gormley N., Gilbert J. A., Smith G., Knight R. (2012) Ultra-high-throughput microbial community analysis on the Illumina HiSeq and MiSeq platforms. *ISME J* 6:1621-1624.

Comai et al. (1983) An altered aroA gene product confers resistance to the herbicide glyphosate. *Science* 221 (4608): 370-371.

Green, P. N. 2005. *Methylobacterium*. In Brenner, D. J., N. R. Krieg, and J. T. Staley (eds.). "Bergey's Manual of Systematic Bacteriology. Volume two, The Proteobacteria. Part C, The alpha-, beta-, delta-, and epsilonproteobacteria." Second edition. Springer, New York. Pages 567-571.

Green, P. N. 2006. *Methylobacterium*. In Dworkin, M., S. Falkow, E. Rosenberg, K.-H. Schleifer, and E. Stackebrandt (eds.). "The Prokaryotes. A Handbook on the Biology of Bacteria. Volume 5. Proteobacteria: Alpha and Beta Subclasses." Third edition. Springer, New York. Pages 257-265.

Green and Ardley (2018) Review of the genus *Methylobacterium* and closely related organisms: a proposal that some *Methylobacterium* species be reclassified into a new genus, *Methylorubrum* gen. nov. International Journal of Systematic and Evolutionary Microbiology 68:2727-2748.

Konstantinos T. K. and Tiedje J. M. (2005) *Proc. Nat. Acad. Sci. USA* 102:2567-2572.

Lidstrom, M. E. 2006. Aerobic methylotrophic prokaryotes. In Dworkin, M., S. Falkow, E. Rosenberg, K.-H. Schleifer, and E. Stackebrandt (eds.). "The Prokaryotes. A Handbook on the Biology of Bacteria. Volume 2.

Ecophysiology and biochemistry." Third edition. Springer, New York. Pages 618-634.

Sy, A., Giraud, E., Jourand, P., Garcia, N., Willems, A., De Lajudie, P., Prin, Y., Neyra, M., Gillis, M., Boivin-Masson, C., and Dreyfus, B. 2001. Methylotrophic *Methylobacterium* Bacteria Nodulate and Fix Nitrogen in Symbiosis with Legumes. Jour. Bacteriol. 183 (1): 214-220.

Sanger F, Nicklen S, Coulson AR (1977) DNA sequencing with chain-terminating inhibitors. *Proc Natl Acad Sci USA*. 74 (12): 5463-5467.

Vogel, H. J., and D. M. Bonner. 1956. Acetylornithinase of *Escherichia coli*: Partial purification and some properties. *J. Biol. Chem.* 218:97-106.

Whittenbury, R., S. L. Davies, and J. F. Wilkinson. 1970. Enrichment, isolation and some properties of methane-utilizing bacteria. *J. Gen. Microbiol.* 61:205-218.

Having illustrated and described the principles of the present disclosure, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A method for improving harvested yield of a corn plant that comprises:
   (a) applying a composition to a corn plant or a corn plant part, wherein the composition comprises (i) *Methylobacterium* isolate NLS0807 (NRRL B-67743), NLS0662 (NRRL B-67742), or NLS0648 (NRRL B-67741); wherein said composition further comprises at least one additional component selected from the group consisting of an additional active ingredient, an agriculturally acceptable adjuvant, and an agriculturally acceptable excipient; and,
   (b) growing the corn plant to maturity, thereby improving yield of the corn plant.

2. The method of claim 1, wherein the composition is applied to a corn seed.

3. The method of claim 1, wherein the composition comprises the *Methylobacterium* at a titer of about $1 \times 10^6$ CFU/gm to about $1 \times 10^{14}$ CFU/gm for a solid composition or at a titer of about $1 \times 10^6$ CFU/mL to about $1 \times 10^{11}$ CFU/mL for a liquid composition.

4. The method of claim 1, wherein the composition is applied to foliage of the corn plant.

5. The method of claim 1 wherein said composition is applied by spraying, coating, partially coating, immersing, and/or imbibing the corn plant or plant part with the composition.

6. The method of claim 1, wherein the composition further comprises an additional active ingredient and the additional active ingredient is selected from the group consisting of a fungicide, insecticide, nematicide, and a second biological.

7. The method of claim 6, wherein the additional active ingredient is selected from the group consisting of clothianidin, *Bacillus firmus*, abamectin, thiamethoxam, imidacloprid, azoxystrobin, fluopyram, fluoxastrobin, ipconazole, mefenoxam, metalaxyl, penflufen, prothioconazole, pyraclostrobin, and sedaxane.

8. The method of claim 1, wherein the composition comprises (i) a *Methylobacterium* wherein the chromosomal genomic DNA has at least 99%, 99.9, 99.8, 99.7, 99.6%, or 99.5% sequence identity to chromosomal genomic DNA of NLS0807 (NRRL B-67743), NLS0662 (NRRL B-67742), or NLS0648 (NRRL B-67741).

9. The method of claim 1, wherein said composition further comprises an agriculturally acceptable excipient and said agriculturally acceptable excipient is a clay or inorganic solid selected from the group consisting of calcium bentonite, kaolin, china clay, talc, perlite, mica, vermiculite, silicas, quartz powder, montmorillonite and mixtures thereof.

10. The method of claim 2, wherein said composition is applied to the corn seed in furrow.

* * * * *

SEQUENCE LISTING

```
<160> NUMBER OF SEQ ID NOS: 73

<210> SEQ ID NO 1
<211> LENGTH: 300
<212> TYPE: DNA
<213> ORGANISM: Methylobacterium

<400> SEQUENCE: 1
acggtcaccc cacggactgg gcgagtacct caccggtgtt ctatcataac gccgagttag     60
ttttcgaccg tcccttatgc gatgtaccac cggtgtcggc agccgatttc gtcccaccgg    120
gagctggcgt tccggttcag accaccatca tcggtcacga tgtctggatt ggacacgggg    180
ccttcatctc ccccggcgtg actataggaa acggcgcgat cgtcggggcc caggcggtcg    240
tcacaagaga tgtcccaccc tatgcggtag ttgctggcgt ccccgcgacc gtacgacgat    300

<210> SEQ ID NO 2
<211> LENGTH: 300
<212> TYPE: DNA
<213> ORGANISM: Methylobacterium

<400> SEQUENCE: 2
ccaataaaag cgttggccgc ctgggcaacc cgatccgagc ctaagactca aagcgcaagc     60
gaacacttgg tagagacagc ccgccgacta cggcgttcca gcactctccg gctttgatcg    120
gataggcatt ggtcaaggtg ccggtggtga tgacctcgcc cgccgcaagc ggcgaattac    180
tcggatcagc ggccagcacc tcgaccaagt gtcggagcgc gaccaaaggg ccacgttcga    240
ggacgtttga ggcgcgacca gtctcgatag tctcatcgtc gcggcgaagc tgcacctcga    300

<210> SEQ ID NO 3
<211> LENGTH: 300
<212> TYPE: DNA
<213> ORGANISM: Methylobacterium

<400> SEQUENCE: 3
cgatggcacc gacctgccat gcctctgccg tccgcgccag aatggtaaag aggacgaagg     60
gggtaaggat cgtcgctgca gtgttgagca gcgaccagag aaggggccg aacatcggca    120 tcaaacctcg attgccactc ggacgcgaag cgcgtcttga aggagggatg gaagcgaaac    180
ggccgcagag taaccgccga cgaaagattg caccctcat cgagcaggat cggaggtgaa    240
ggcaagcgtg ggttattggt aagtgcaaaa aatataatgg tagcgtcaga tctagcgttc    300

<210> SEQ ID NO 4
<211> LENGTH: 23
```

```
<212> TYPE: DNA
<213> ORGANISM: Artificial Sequence
<220> FEATURE:
<223> OTHER INFORMATION: Synthetic

<400> SEQUENCE: 4
cctcaccggt gttctatcat aac                                           23

<210> SEQ ID NO 5
<211> LENGTH: 20
<212> TYPE: DNA
<213> ORGANISM: Artificial Sequence
<220> FEATURE:
<223> OTHER INFORMATION: Synthetic

<400> SEQUENCE: 5
ccgatgatgg tggtctgaac                                               20

<210> SEQ ID NO 6
<211> LENGTH: 21
<212> TYPE: DNA
<213> ORGANISM: Artificial Sequence
<220> FEATURE:
<223> OTHER INFORMATION: Synthetic

<400> SEQUENCE: 6
cgtcccttat gcgatgtacc a                                             21

<210> SEQ ID NO 7
<211> LENGTH: 22
<212> TYPE: DNA
<213> ORGANISM: Artificial Sequence
<220> FEATURE:
<223> OTHER INFORMATION: Synthetic

<400> SEQUENCE: 7
gatccgagcc taagactcaa ag                                            22

<210> SEQ ID NO 8
<211> LENGTH: 21
<212> TYPE: DNA
<213> ORGANISM: Artificial Sequence
<220> FEATURE:
<223> OTHER INFORMATION: Synthetic

<400> SEQUENCE: 8
gaccaatgcc tatccgatca a                                             21

<210> SEQ ID NO 9
<211> LENGTH: 20
<212> TYPE: DNA
<213> ORGANISM: Artificial Sequence
<220> FEATURE:
<223> OTHER INFORMATION: Synthetic

<400> SEQUENCE: 9
aacacttggt agagacagcc                                               20

<210> SEQ ID NO 10
<211> LENGTH: 21
<212> TYPE: DNA
<213> ORGANISM: Artificial Sequence
<220> FEATURE:
<223> OTHER INFORMATION: Synthetic

<400> SEQUENCE: 10
```
aaggagggat ggaagcgaaa c                                                      21

<210> SEQ ID NO 11
<211> LENGTH: 19
<212> TYPE: DNA
<213> ORGANISM: Artificial Sequence
<220> FEATURE:
<223> OTHER INFORMATION: Synthetic

<400> SEQUENCE: 11
ataacccacg cttgccttc                                                         19

<210> SEQ ID NO 12
<211> LENGTH: 21
<212> TYPE: DNA
<213> ORGANISM: Artificial Sequence
<220> FEATURE:
<223> OTHER INFORMATION: Synthetic

<400> SEQUENCE: 12
cgcagagtaa ccgccgacga a                                                      21

<210> SEQ ID NO 13
<211> LENGTH: 300
<212> TYPE: DNA
<213> ORGANISM: Methylobacterium

<400> SEQUENCE: 13
gcaaaacgac ctaatagttc tacagcggca tgcgccaagt cagcgcggtg aacagtatac            60
ctgggagcaa cttgtcctcc gaaacccaca taaaacaaat tactcctggc agtgcccagt           120
ccatcaaaat cgaatacaat atttctcgag gaggcatctg taatagcctg ccaaagcaac           180
aaagctatgg cgccgttatg actttcattg cttctggtag acataaaata atatgccgat           240
ttgtgatccc aaatgtagaa tattgccgca tcaattgcgc caagtttatt tcggatcgat           300

<210> SEQ ID NO 14
<211> LENGTH: 300
<212> TYPE: DNA
<213> ORGANISM: Methylobacterium

<400> SEQUENCE: 14
ggcgccaacg gtatgatcgc atgattttcc tgcggcatag cttgcgggaa tggcgtattt            60
ggcgctctcc tcaggaattt ctaagggcat acgcaggaac tctacagcac ttttactggt           120
attttgtagt gacagcggag gaggctggtg ctcaaggtaa tcgtgatgaa gtgatccggg           180
ccattcgggg cgcgtttcta gtctttccaa tccgcgccct gtaccacgta ttacgccgga           240
ccggtctgcg ccgcgccgcc ctcttgaccg ccctaaatgt ctaagagcgt ctaacaaagc           300

<210> SEQ ID NO 15
<211> LENGTH: 300
<212> TYPE: DNA
<213> ORGANISM: Methylobacterium

<400> SEQUENCE: 15
gacgatatcg ctcatcttca ctgcattgaa gctggtgccg tactgcatag ggatgaaaaa            60
gtgatgcgga tagacggctg acgggaaagc gcctggtcga tcgaagactt tgctgacgag           120
gttgtggtag ccccggatat aggcatcgaa ggccgggacg ttgatcccat cctttgcctt           180
atcttgactg gcgtcgtcgc gtgccgtcag aacgggcacg tcgcaggtca tcgaggccag           240
caccttgcgg aacacctgcg ttccgccgtt gggattatcg acggcgaacg cggtggccgc           300

<210> SEQ ID NO 16
<211> LENGTH: 21
<212> TYPE: DNA
<213> ORGANISM: Artificial Sequence
<220> FEATURE:
<223> OTHER INFORMATION: Synthetic

<400> SEQUENCE: 16
gtcctccgaa acccacataa a                                              21

<210> SEQ ID NO 17
<211> LENGTH: 23
<212> TYPE: DNA
<213> ORGANISM: Artificial Sequence
<220> FEATURE:
<223> OTHER INFORMATION: Synthetic

<400> SEQUENCE: 17
ctaccagaag caatgaaagt cat                                            23

<210> SEQ ID NO 18
<211> LENGTH: 22
<212> TYPE: DNA
<213> ORGANISM: Artificial Sequence
<220> FEATURE:
<223> OTHER INFORMATION: Synthetic

<400> SEQUENCE: 18
tctgtaatag cctgccaaag ca                                             22

<210> SEQ ID NO 19
<211> LENGTH: 19
<212> TYPE: DNA
<213> ORGANISM: Artificial Sequence
<220> FEATURE:
<223> OTHER INFORMATION: Synthetic

<400> SEQUENCE: 19
ggctggtgct caaggtaat                                                 19

<210> SEQ ID NO 20
<211> LENGTH: 20
<212> TYPE: DNA
<213> ORGANISM: Artificial Sequence
<220> FEATURE:
<223> OTHER INFORMATION: Synthetic

<400> SEQUENCE: 20
acatttaggg cggtcaagag                                                20

<210> SEQ ID NO 21
<211> LENGTH: 19
<212> TYPE: DNA
<213> ORGANISM: Artificial Sequence
<220> FEATURE:
<223> OTHER INFORMATION: Synthetic

<400> SEQUENCE: 21
atgaagtgat ccgggccat                                                 19

<210> SEQ ID NO 22
<211> LENGTH: 21
<212> TYPE: DNA
<213> ORGANISM: Artificial Sequence
<220> FEATURE:

<223> OTHER INFORMATION: Synthetic

<400> SEQUENCE: 22
ccgtactgca tagggatgaa a                                              21

<210> SEQ ID NO 23
<211> LENGTH: 21
<212> TYPE: DNA
<213> ORGANISM: Artificial Sequence
<220> FEATURE:
<223> OTHER INFORMATION: Synthetic

<400> SEQUENCE: 23
taaggcaaag gatgggatca a                                              21

<210> SEQ ID NO 24
<211> LENGTH: 21
<212> TYPE: DNA
<213> ORGANISM: Artificial Sequence
<220> FEATURE:
<223> OTHER INFORMATION: Synthetic

<400> SEQUENCE: 24
ttgctgacga ggttgtggta g                                              21

<210> SEQ ID NO 25
<211> LENGTH: 300
<212> TYPE: DNA
<213> ORGANISM: Methylobacterium

<400> SEQUENCE: 25
caactatgta gacccgacgg tgcgatttca cttcgcaaag ccgcagggca gcacccttgc     60
gctcaatgtt gacgccagcg tgatctatac tattaccgtc acgcacacgc agggcggcgt    120
acagattcat cgcgagagta agaaccacca tcagaccatc acgcgcagcg acctgagcaa    180
gcagttcggc gttggtgtgg ccgaccagct gacgcgcgat caggtcatga aggtgatcga    240
gtcggcattt cgcgacgcta cccgctaaga tcggcgccca cgaaacgcta cgagactagg    300

<210> SEQ ID NO 26
<211> LENGTH: 300
<212> TYPE: DNA
<213> ORGANISM: Methylobacterium

<400> SEQUENCE: 26
agccggcatc ttgttcaagg cgctcacctc gacgccgacg ctgtaggcga cttgagaggg     60
cgtctcatat gaacgaagca tcttcgcgta gagaaccttc ttgttctcct gcgtgatgtt    120
cgctttgcag acgttgactg ccgccatgaa cgccgaagcc ttgcgcgctt catcgtaatc    180
gcctgcgaag gcgggtagtg aaaagcttag tgcaatggca aacacagccg ccgaacgtcg    240
catggtatcc gtccccgatt gacggcagtg ccgccatatc tcggctttag cagagctgat    300

<210> SEQ ID NO 27
<211> LENGTH: 300
<212> TYPE: DNA
<213> ORGANISM: Methylobacterium

<400> SEQUENCE: 27
aacctgcgcc ggccgaggtt tcgcgagccg tcgccacggg caacgcctcg cccgcgatgt     60
gcaaaaaagt ccccggcact tcgcgccgtc gtccgatcca cgaccgcgaa tttctcaacg    120
agtacaaggt gcttatggga gatccgagcg tccgtcccgg agcccgagac cgcgcggccc    180

```
gagtaatagg cgaaaaagac tcctactcct cgggcttctc gggcccctc agcaacatct    240 acgcttgccg cccatcaccc tggcgggaga tcagcgacga gacacaggcc cacttcgccc    300
```

<210> SEQ ID NO 28
<211> LENGTH: 22
<212> TYPE: DNA
<213> ORGANISM: Artificial Sequence
<220> FEATURE:
<223> OTHER INFORMATION: Synthetic

<400> SEQUENCE: 28

```
ttgacgccag cgtgatctat ac                                              22
```

<210> SEQ ID NO 29
<211> LENGTH: 22
<212> TYPE: DNA
<213> ORGANISM: Artificial Sequence
<220> FEATURE:
<223> OTHER INFORMATION: Synthetic

<400> SEQUENCE: 29

```
gtgatggtct gatggtggtt ct                                              22
```

<210> SEQ ID NO 30
<211> LENGTH: 19
<212> TYPE: DNA
<213> ORGANISM: Artificial Sequence
<220> FEATURE:
<223> OTHER INFORMATION: Synthetic

<400> SEQUENCE: 30

```
tattaccgtc acgcacacg                                                  19
```

<210> SEQ ID NO 31
<211> LENGTH: 24
<212> TYPE: DNA
<213> ORGANISM: Artificial Sequence
<220> FEATURE:
<223> OTHER INFORMATION: Synthetic

<400> SEQUENCE: 31

```
cttcgcgtag agaaccttct tgtt                                            24
```

<210> SEQ ID NO 32
<211> LENGTH: 22
<212> TYPE: DNA
<213> ORGANISM: Artificial Sequence
<220> FEATURE:
<223> OTHER INFORMATION: Synthetic

<400> SEQUENCE: 32

```
cttcgcaggc gattacgatg aa                                              22
```

<210> SEQ ID NO 33
<211> LENGTH: 20
<212> TYPE: DNA
<213> ORGANISM: Artificial Sequence
<220> FEATURE:
<223> OTHER INFORMATION: Synthetic

<400> SEQUENCE: 33

```
cgtgatgttc gctttgcaga                                                 20
```

<210> SEQ ID NO 34

```
<211> LENGTH: 23
<212> TYPE: DNA
<213> ORGANISM: Artificial Sequence
<220> FEATURE:
<223> OTHER INFORMATION: Synthetic

<400> SEQUENCE: 34 ccgcgaatttt ctcaacgagt aca                                              23

<210> SEQ ID NO 35
<211> LENGTH: 21
<212> TYPE: DNA
<213> ORGANISM: Artificial Sequence
<220> FEATURE:
<223> OTHER INFORMATION: Synthetic

<400> SEQUENCE: 35
gcccgaggag taggagtctt t                                                 21

<210> SEQ ID NO 36
<211> LENGTH: 20
<212> TYPE: DNA
<213> ORGANISM: Artificial Sequence
<220> FEATURE:
<223> OTHER INFORMATION: Synthetic

<400> SEQUENCE: 36
aggtgcttat gggagatccg                                                   20

<210> SEQ ID NO 37
<211> LENGTH: 300
<212> TYPE: DNA
<213> ORGANISM: Methylobacterium

<400> SEQUENCE: 37
agtcattgat caagcaaccc ctattgagtt ggatatcgaa ggatcaaggt cgcgtcaata        60
gatgcatcta tcaggccaaa tgtcgctttt caagaatggc tctttcgaag ctatctttat       120
aatcgctcgc cattctctca ttaccaaaat cgaccttaac tagctcgaca ttgatgcgag       180
cagctccggc aaacgaggag agattgacct taaaggaatt gaacgcctca agcaattcag       240
acacattacc aggagtgcta tagcaacaac cagacccata tcggtcaata acctcttta       300

<210> SEQ ID NO 38
<211> LENGTH: 300
<212> TYPE: DNA
<213> ORGANISM: Methylobacterium

<400> SEQUENCE: 38
cgcaaaacga tttatcactg ccatcttgtt gtttgataac ccttttttac cagacgttat        60
gctgggcgag aaagaggact agcagatcgg agcggtatcg cgattttttcg gtagttcgcg      120
cctacaacag gataagatcc gatagtgaag caacatggct gttttttgat ttgtaagtca       180
gcaacttaag cagccagcct atctgccgtc gcagacgctt gaggcatcgg gcagcatctt       240
agaaaaggtg gcagtaattg ccacagcgga acgtagcggc acggataagc acgcagggtc       300

<210> SEQ ID NO 39
<211> LENGTH: 300
<212> TYPE: DNA
<213> ORGANISM: Methylobacterium

<400> SEQUENCE: 39
cccatctgga cccaatatcc ccttcatcga caattcccga gtaagtgtgg gttcgaggat        60
```
ttcgcgaaac agccttgttc gttcctccgg ccttaaaatt ggcgtgccgt cgggagatcg    120
ataggcatcc cttacctgcc tttcgaccgc cggcacacgc gcgccggtcg tcgtgttcac    180
ggccacggaa tggacgaagg tgcgccgctc atttcgctcg tttgccgtct ccaccatcca    240
ggaggccagc aggacggttt cgtctcgacc gccggtcaca cacaccgcaa gggactcagg    300

<210> SEQ ID NO 40
<211> LENGTH: 22
<212> TYPE: DNA
<213> ORGANISM: Artificial Sequence
<220> FEATURE:
<223> OTHER INFORMATION: Synthetic

<400> SEQUENCE: 40
tcgctcgcca ttctctcatt ac    22

<210> SEQ ID NO 41
<211> LENGTH: 22
<212> TYPE: DNA
<213> ORGANISM: Artificial Sequence
<220> FEATURE:
<223> OTHER INFORMATION: Synthetic

<400> SEQUENCE: 41
aggtcaatct ctcctcgttt gc    22

<210> SEQ ID NO 42
<211> LENGTH: 18
<212> TYPE: DNA
<213> ORGANISM: Artificial Sequence
<220> FEATURE:
<223> OTHER INFORMATION: Synthetic

<400> SEQUENCE: 42
tcgacattga tgcgagca    18

<210> SEQ ID NO 43
<211> LENGTH: 22
<212> TYPE: DNA
<213> ORGANISM: Artificial Sequence
<220> FEATURE:
<223> OTHER INFORMATION: Synthetic

<400> SEQUENCE: 43
ttcgcgccta caacaggata ag    22

<210> SEQ ID NO 44
<211> LENGTH: 23
<212> TYPE: DNA
<213> ORGANISM: Artificial Sequence
<220> FEATURE:
<223> OTHER INFORMATION: Synthetic

<400> SEQUENCE: 44
cagataggct ggctgcttaa gtt    23

<210> SEQ ID NO 45
<211> LENGTH: 18
<212> TYPE: DNA
<213> ORGANISM: Artificial Sequence
<220> FEATURE:
<223> OTHER INFORMATION: Synthetic

<400> SEQUENCE: 45

```
tccgatagtg aagcaaca                                                  18
```

<210> SEQ ID NO 46
<211> LENGTH: 24
<212> TYPE: DNA
<213> ORGANISM: Artificial Sequence
<220> FEATURE:
<223> OTHER INFORMATION: Synthetic

<400> SEQUENCE: 46

```
gagtaagtgt gggttcgagg attt                                           24
```

<210> SEQ ID NO 47
<211> LENGTH: 23
<212> TYPE: DNA
<213> ORGANISM: Artificial Sequence
<220> FEATURE:
<223> OTHER INFORMATION: Synthetic

<400> SEQUENCE: 47

```
aggtaaggga tgcctatcga tct                                            23
```

<210> SEQ ID NO 48
<211> LENGTH: 18
<212> TYPE: DNA
<213> ORGANISM: Artificial Sequence
<220> FEATURE:
<223> OTHER INFORMATION: Synthetic

<400> SEQUENCE: 48

```
cggaggaacg aacaaggc                                                  18
```

<210> SEQ ID NO 49
<211> LENGTH: 300
<212> TYPE: DNA
<213> ORGANISM: Methylobacterium

<400> SEQUENCE: 49

```
acctgctaaa atcacgtcct ctcagattga aaatcattg aagaaacgtg tcgaacgatt     60
gccgggggatt atgacgttag atcaattgaa aaatacaagc tttgaaattg agttacagcc  120
aaaagatgcc ccggatccgg acccatcaga cttcggtggc tagttcgagc caaactcgaa  180
cgtcgccatg gcgcgcaagt cgcaatacca tttcacagcg cagcggttat ttcgttgtac  240
actgtagcaa tgcgtcggct tgcgcgcttc cgctggcgat caaaggtccg ccgatttacg  300
```

<210> SEQ ID NO 50
<211> LENGTH: 300
<212> TYPE: DNA
<213> ORGANISM: Methylobacterium

<400> SEQUENCE: 50

```
tcccgaacat acaatggagg aagcgtgtgg taggccaatt tgtaacgaaa tatggcatcg     60
gtcacggctc tctcaataaa ttcgatctca agtcttctga acgagcatgc ctcatcctta   120
tcctgagcga acgcctgcca gtttgcagtc attccaacat acatagccaa aaaggcgagg   180
tagaccttca tacgggcacc tcaatcgtcc ccattcgttc aagctccttc aagataacag   240
ccgcaccaca ttgctgagat cgaagattcg gatcaaatat tccatcaaat ttatactttc   300
```

<210> SEQ ID NO 51
<211> LENGTH: 300
<212> TYPE: DNA
<213> ORGANISM: Methylobacterium

<400> SEQUENCE: 51
gcatcctttg cgctcgcagg cctaaggtca agcccggtta cttcgtttgg tagaacgagg    60
tagacgatgc ctagtcttaa ggtggcccat gttaaccaac agggccagaa catgattata   120
gttccgttag atgccaactt cggttacaaa accgatggtg agcagtccga catcatgttc   180
gaaatacagg acgcggcgcg gtccgccggt cttgcgggtg ccgtagtagc gttctggcag   240
tcaggtggac aaacccgttt ccggggcccg gctccgtggc acccattcct tcgcagcctc   300

<210> SEQ ID NO 52
<211> LENGTH: 22
<212> TYPE: DNA
<213> ORGANISM: Artificial Sequence
<220> FEATURE:
<223> OTHER INFORMATION: Synthetic

<400> SEQUENCE: 52
gcgcaagtcg caataccatt tc                                              22

<210> SEQ ID NO 53
<211> LENGTH: 21
<212> TYPE: DNA
<213> ORGANISM: Artificial Sequence
<220> FEATURE:
<223> OTHER INFORMATION: Synthetic

<400> SEQUENCE: 53
cgtaaatcgg cggacctttg a                                               21

<210> SEQ ID NO 54
<211> LENGTH: 19
<212> TYPE: DNA
<213> ORGANISM: Artificial Sequence
<220> FEATURE:
<223> OTHER INFORMATION: Synthetic

<400> SEQUENCE: 54
cgcagcggtt atttcgttg                                                  19

<210> SEQ ID NO 55
<211> LENGTH: 22
<212> TYPE: DNA
<213> ORGANISM: Artificial Sequence
<220> FEATURE:
<223> OTHER INFORMATION: Synthetic

<400> SEQUENCE: 55
acgagcatgc ctcatcctta tc                                              22

<210> SEQ ID NO 56
<211> LENGTH: 21
<212> TYPE: DNA
<213> ORGANISM: Artificial Sequence
<220> FEATURE:
<223> OTHER INFORMATION: Synthetic

<400> SEQUENCE: 56
cgattgaggt gcccgtatga a                                               21

<210> SEQ ID NO 57
<211> LENGTH: 20
<212> TYPE: DNA
<213> ORGANISM: Artificial Sequence
<220> FEATURE:

```
<223> OTHER INFORMATION: Synthetic

<400> SEQUENCE: 57
tgccagtttg cagtcattcc                                                  20

<210> SEQ ID NO 58
<211> LENGTH: 23
<212> TYPE: DNA
<213> ORGANISM: Artificial Sequence
<220> FEATURE:
<223> OTHER INFORMATION: Synthetic

<400> SEQUENCE: 58
cccggttact tcgtttggta gaa                                              23

<210> SEQ ID NO 59
<211> LENGTH: 24
<212> TYPE: DNA
<213> ORGANISM: Artificial Sequence
<220> FEATURE:
<223> OTHER INFORMATION: Synthetic

<400> SEQUENCE: 59
cgaagttggc atctaacgga acta                                             24

<210> SEQ ID NO 60
<211> LENGTH: 20
<212> TYPE: DNA
<213> ORGANISM: Artificial Sequence
<220> FEATURE:
<223> OTHER INFORMATION: Synthetic

<400> SEQUENCE: 60
tggcccatgt taaccaacag                                                  20

<210> SEQ ID NO 61
<211> LENGTH: 300
<212> TYPE: DNA
<213> ORGANISM: Methylobacterium

<400> SEQUENCE: 61
gcccttctgt caggcgatat tgtataatgg cgttgcccca atagaagcag ccattcgtgc      60
gagggcagca gcgacgctag gtcgaaagag catcctaatc tcgatcaaga tgcgactgag     120
atttctgatg aaaatatcta gacacaagca aagctggtga aattacaacg atcatggcga     180
caattgcggc caattcggcc ggaacttgaa ggaacataaa aatgaatatt acaaatatac     240
cgcaaagcat gtagagttgc tacaccaagg gtcgggacgt ccaaaaaaac tcactgagga     300

<210> SEQ ID NO 62
<211> LENGTH: 300
<212> TYPE: DNA
<213> ORGANISM: Methylobacterium

<400> SEQUENCE: 62
ggaacataaa aatgaatatt acaaatatac cgcaaagcat gtagagttgc tacaccaagg      60
gtcgggacgt ccaaaaaaac tcactgagga agtcgactgg aagcacgagg cgccccccc     120 aggagcgggg cgaccggcaa gggggcccgc aattgtcgcc atgatcgacc agcttaggta     180
ggatcctctt tcgacctaac gaatggctgc ttctattggg gcaacgccat tatacaatat     240
cgcctgacca tctggaacgc ggcccggtcc accggcaggt tggcgacgac agcgtcggag     300
```

<210> SEQ ID NO 63
<211> LENGTH: 300
<212> TYPE: DNA
<213> ORGANISM: Methylobacterium

<400> SEQUENCE: 63

| | | | | | |
|---|---|---|---|---|---|
| cggcgtcgac | cagccgggcg | aactgcttgg | gcatgctctc | ccgcgacgcc | ggccacagcc | 60 |
| gcgtccccgt | ccctccgcac | aggatcatcg | ggtggatttg | aaaggcaaaa | cgggacatca | 120 |
| ggataggccg | ctcaggcgtt | ggcgctgagg | cgcttgatgt | cggcgtcgac | catctcggtg | 180 |
| atcagcgcct | cgaggctggt | ctcggcctcc | cagccgaagg | tcgccttggc | cttggcgggg | 240 |
| ttgcccagca | gcacctcgac | ctctgccggc | cggaacagcg | ccgggtcgac | gatcaggtgg | 300 |

<210> SEQ ID NO 64
<211> LENGTH: 300
<212> TYPE: DNA
<213> ORGANISM: Methylobacterium

<400> SEQUENCE: 64

| | | | | | |
|---|---|---|---|---|---|
| ctggacatgc | gcccacccccg | gccaagtccg | accgcaccgg | caaccgctcc | tgtagtcgtc | 60 |
| gtcatcgttc | tcacccctga | ggcggagacc | gtccgctaac | ggggtgtctc | aagcaaccgt | 120 |
| ggggcggagg | aacacgcacg | tagtcgcgtt | tcaaggttcg | cacgaacgcc | tcggccatgc | 180 |
| cgttgctctg | cgggctctcc | agcggcgtcg | tttttggcac | caaaccaagg | tcgcgggcga | 240 |
| agcggcgcgt | gtcgcgggga | ctgtcaggaa | tttcgtgtgg | gggcggccat | agtggatccg | 300 |

<210> SEQ ID NO 65
<211> LENGTH: 300
<212> TYPE: DNA
<213> ORGANISM: Methylobacterium

<400> SEQUENCE: 65

| | | | | | |
|---|---|---|---|---|---|
| ggaaatcggc | ttcaagtacg | acgtcacgcc | ggccatgcag | gtcacgggtg | cactgttcaa | 60 |
| tctcgagcgc | gacaaccagc | cgttcccctc | gaacgtggag | tccggcctcg | tccttggcgc | 120 |
| aggtcagaca | cgcacccagg | gcgcggaaat | cggcctggcc | ggctatctaa | ccgattggtg | 180 |
| gcaggtctttt | ggcggctacg | cttataccga | ggcacgcgta | ctctcgccac | tggaagacga | 240 |
| tggagacgtg | atcgcagcag | gtaatctcgt | cggcaacgtt | ccgctaaata | ctttcagtct | 300 |

<210> SEQ ID NO 66
<211> LENGTH: 300
<212> TYPE: DNA
<213> ORGANISM: Methylobacterium

<400> SEQUENCE: 66

| | | | | | |
|---|---|---|---|---|---|
| cggcctggcc | ggctatctaa | ccgattggtg | gcaggtcttt | ggcggctacg | cttataccga | 60 |
| ggcacgcgta | ctctcgccac | tggaagacga | tggagacgtg | atcgcagcag | gtaatctcgt | 120 |
| cggcaacgtt | ccgctaaata | ctttcagtct | gttcaacaag | ttcgatatca | acgagaattt | 180 |
| ctccgttgct | ctgggctatt | actatcagga | tgccagcttt | gcctcctcag | acaatgcagt | 240 |
| gcgtttgcca | agttattcgc | ggttcgatgg | cgggttgttc | tatcgattcg | acgagttgac | 300 |

<210> SEQ ID NO 67
<211> LENGTH: 300
<212> TYPE: DNA
<213> ORGANISM: Methylobacterium

<400> SEQUENCE: 67

```
acgttccgct aaatactttc agtctgttca acaagttcga tatcaacgag aatttctccg      60
ttgctctggg ctattactat caggatgcca gctttgcctc ctcagacaat gcagtgcgtt     120
tgccaagtta ttcgcggttc gatggcgggt tgttctatcg attcgacgag ttgacacgcg     180
ttcagcttag cgtcgagaac attttcgaca ggcgttacat catcaactcc aacaacaaca     240
acaacctcac gcctggcgcg ccgagaacag tccgcgtgca attgatcgct cggttctaaa     300
```

<210> SEQ ID NO 68
<211> LENGTH: 300
<212> TYPE: DNA
<213> ORGANISM: Methylobacterium

<400> SEQUENCE: 68

```
agcccacaag cctgatgcac ttaactacat cctctaatgt cgcgccaatt tgcttggcgg      60
caggggatgt tgtatcgtca taggcttgtc taaccggaac ttgtttgcca atctctttgg     120
cgatcgcaac cgccatctcg tgttcgtcaa ccatgtgcgc gttcctctaa ttgcactcat     180
ggtgccacgt gcacctccga tcgtctcgtg tctagaatga aggtgggaac aaccttacac     240
aggctttcgc gacgcgcgaa tttctggttt ctccgcctcg gatgtgggtt tgagcgcttc     300
```

<210> SEQ ID NO 69
<211> LENGTH: 300
<212> TYPE: DNA
<213> ORGANISM: Methylobacterium

<400> SEQUENCE: 69

```
cttttcattt gtcatgatct cgaccaaggt attcacggca agctcggtct gttgcttagc      60
aagtgcctga acttcgcgaa cgatcggctc tcgacccttc gggttcgaga cctgtcccttt    120 ttgaaaacca cgtgccctac acttttcggg atcaaggtgc gggttggctt tggtcaaaat    180
tctctggcgt cccattacac gccctccgca tcatcgttcc cgcgaacgat ctgaccccccg   240 acttccgcga ggaagcgtgt ggcgtgatcc tcgaagcgga atgccacctc gaactgttcc    300
```

<210> SEQ ID NO 70
<211> LENGTH: 300
<212> TYPE: DNA
<213> ORGANISM: Methylobacterium

<400> SEQUENCE: 70

```
cagcagcaag cagatcgttg aaaaccgctt gaaccgcatc ttgatcggga ccggaaccaa      60
tcaggtcatc taggtaaacc gagacgtaaa ctcgtttgcg ctcggcatct ttcagaacgt    120
ccgtgatgcc agaccgcatt agtaccatcg tcgccaaggc gggcgactga acgaagccga    180
tcggcagaga gtaacgggga ccgcccctaa tcgggttgcg aacgcaagac cacttagcaa    240
aggttcgagc acggccgaac ttcgcatggt ggagagccgc ggcaacacgg ttccgtgata    300
```

<210> SEQ ID NO 71
<211> LENGTH: 300
<212> TYPE: DNA
<213> ORGANISM: Methylobacterium

<400> SEQUENCE: 71

```
tagacattcc aacaaaccgg caagaggctc gtcctcactc gaggatttgt tgggacttgc      60
atgatgtcga agcggagccg ttatgacctg ggtgcgatca tgcgccgagc atgggagatg    120
gctcgggagg cggcattcgc ggttggcgag cgggcacgga ctcaccttgc tgccgcgatg    180
cgcagcgcgt gggccgaagc caagttggca ctcgcgccca cgaagacgga gcaggatcgt    240
```

```
ctctctccga gcgacatgat cggacatgag gacgcctacc aaggccgggt tctaaaatat        300

<210> SEQ ID NO 72
<211> LENGTH: 300
<212> TYPE: DNA
<213> ORGANISM: Methylobacterium

<400> SEQUENCE: 72
aagatggata cgacaagcgc gattacatta tttgcgaaat agatggacaa ataaaagaca         60
aaggactgat gtatttcctt aaatctggac aagttgacct ctttcacata gaagtcacca        120
ctccctttgg gacaatttgg tgtcacgaaa acatagaggc cgaacttctt agctgaatta        180
tcgcgctccg ggttcttatg cggctgagtg aagcgcggga cagcttgcga gcagggccgc        240
caatggcagc cgggatgaca caatgctcgg tctcccgacg cttcttcaat cgggagcgct        300

<210> SEQ ID NO 73
<211> LENGTH: 299
<212> TYPE: DNA
<213> ORGANISM: Methylobacterium

<400> SEQUENCE: 73
agctgaatta tcgcgctccg ggttcttatg cggctgagtg aagcgcggga cagcttgcga         60
gcagggccgc caatggcagc cgggatgaca caatgctcgg tctcccgacg cttcttcaat        120
cgggagcgct tcgcagcccg gggcggcgcg ctcatgcgtc acgacctggg ccctgcgcac        180
cttcgcggcc ccgccgtccc ggcagatccc tgatgcccca agtgggcggc cactccatca        240
aagaacgccg gcctgtggca gatctcgtag gcataccgag gttccgcagt gcccccacc        299
```